(12) United States Patent
Hashimoto et al.

(10) Patent No.: US 10,767,765 B2
(45) Date of Patent: Sep. 8, 2020

(54) FLOW-RATE ADJUSTABLE VALVE AND METHOD OF MANUFACTURING THE SAME

(71) Applicant: TOTO LTD., Kitakyushu-shi, Fukuoka (JP)

(72) Inventors: Kenichi Hashimoto, Kitakyushu (JP); Hideyuki Matsui, Kitakyushu (JP); Makoto Hatakeyama, Kitakyushu (JP); Kohei Kawana, Kitakyushu (JP); Tetsuro Kamiyoshi, Kitakyushu (JP); Masanobu Kanashiro, Kitakyushu (JP)

(73) Assignee: TOTO LTD., Kitakyushu-shi, Fukuoka (JP)

( * ) Notice: Subject to any disclaimer, the term of this patent is extended or adjusted under 35 U.S.C. 154(b) by 86 days.

(21) Appl. No.: 15/490,480

(22) Filed: Apr. 18, 2017

(65) Prior Publication Data

US 2017/0321809 A1 Nov. 9, 2017

(30) Foreign Application Priority Data

May 6, 2016 (JP) .................................. 2016-093391

(51) Int. Cl.
*F16K 1/52* (2006.01)
*F16K 31/40* (2006.01)
(Continued)

(52) U.S. Cl.
CPC ................ *F16K 1/523* (2013.01); *E03C 1/02* (2013.01); *F16K 27/029* (2013.01); *F16K 31/04* (2013.01);
(Continued)

(58) Field of Classification Search
None
See application file for complete search history.

(56) References Cited

U.S. PATENT DOCUMENTS 1,936,301 A 11/1933 Hansen et al.
2,591,991 A * 4/1952 Young .................. E03C 1/0409
137/359
(Continued)

FOREIGN PATENT DOCUMENTS

DE 107 560 C 3/1899
FR 1 240 556 A 9/1960
(Continued)

OTHER PUBLICATIONS

Extended European Search Report in European Patent Application No. 17168057.2, dated Aug. 30, 2017.

*Primary Examiner* — Daphne M Barry
(74) *Attorney, Agent, or Firm* — BakerHostetler

(57) ABSTRACT

The present invention is a flow-rate adjustable valve for adjusting a flow rate of liquid flowing through a flow path. The flow-rate adjustable valve includes: a rotatable member; a lifter linearly movable by a rotation of the rotatable member; a valve body linearly movable by a linear movement of the lifter; a stopper configured to restrict a movable range of the lifter in a fixed state of the stopper in which a position of the stopper is not able to be changed; and a stopper-holding member configured to hold the stopper selectively in the fixed state or in a provisional fixed state in which the position of the stopper is able to be changed.

17 Claims, 23 Drawing Sheets

(51) Int. Cl.

| | |
|---|---|
| *F16K 31/04* | (2006.01) |
| *F16K 31/385* | (2006.01) |
| *F16K 31/524* | (2006.01) |
| *E03C 1/02* | (2006.01) |
| *F16K 27/02* | (2006.01) |
| *F16K 31/50* | (2006.01) |
| *F16K 31/60* | (2006.01) |

(52) U.S. Cl.
CPC ........ *F16K 31/041* (2013.01); *F16K 31/3855* (2013.01); *F16K 31/404* (2013.01); *F16K 31/504* (2013.01); *F16K 31/52408* (2013.01); *F16K 31/52491* (2013.01); *F16K 31/60* (2013.01); *E03C 2001/026* (2013.01)

(56) References Cited

U.S. PATENT DOCUMENTS

| | | | |
|---|---|---|---|
| 3,565,089 A | | 2/1971 | Thompson |
| 5,439,197 A | * | 8/1995 | Itoi ................ F16K 31/506 251/95 |
| 2011/0175002 A1 | | 7/2011 | Grewal |

FOREIGN PATENT DOCUMENTS

| | | | |
|---|---|---|---|
| JP | 2002-38555 | A | 2/2002 |
| JP | 2006112504 | A | 4/2006 |
| JP | 2006226369 | A | 8/2006 |
| JP | 2012-102804 | A | 5/2012 |
| JP | 2013249847 | A | 12/2013 |

\* cited by examiner

FLOW-RATE ADJUSTABLE VALVE AND METHOD OF MANUFACTURING THE SAME

TECHNICAL FIELD

The present invention pertains to a flow-rate adjustable valve for adjusting a flow rate of liquid flowing through a flow path, and a method of manufacturing such a flow-rate adjustable valve. In particular, the present invention pertains to a flow-rate adjustable valve to be used in a washing facility for adjusting a flow rate of supply water, and a method of manufacturing such a flow-rate adjustable valve.

BACKGROUND ART

Various types of flow-rate adjustable valves using valve bodies have been used widely. In addition, it is disclosed in JP-A-H11-325274, for example, to restrict the stroke of a valve body to a desired range.

The flow-rate adjustable valve disclosed in JP-A-H11-325274 includes: a stepping motor; a threaded cylindrical member (lifter) linearly movable via a screw mechanism by a rotation of a rotational shaft of the stepping motor; and a valve body movable by a movement of the threaded cylindrical member. A rotational stopper restricts a rotational range of the screw mechanism. As a result, the movable range of the threaded cylindrical member is restricted, i.e., the movable range of the valve body is restricted.

PATENT DOCUMENT LIST

JP-A-H11-325274

SUMMARY OF INVENTION

Technical Problem

In a flow-rate adjustable valve, in order to achieve a more accurate flow-rate adjustment, it is important to enhance precision in positioning a valve body.

Various investigations and experiments have been made by the inventors. As a result, the inventors have found it effective to adjust a range restricted by a stopper for each flow-rate adjustable valve, in order to achieve a desired range of a stroke of a valve body of each flow-rate adjustable valve with consideration for accumulation of variation in each size and/or in assembly of parts of each flow-rate adjustable valve.

Specifically, for example, regarding a closed-valve position (at which the valve body is controlled farthest on the closing side), if a clearance (margin) is too small, water-stop performance might be not good. On the other hand, if a clearance (margin) is too large, opening-response performance might be not good. Thus, for each flow-rate adjustable valve, it is preferable to adjust a stroke of a valve body thereof, in order to achieve a suitable closed-valve position.

The present invention has been made based on the above findings. The object of the present invention is to provide a flow-rate adjustable valve that can adjust a stroke of a valve body thereof so as to achieve a suitable closed-valve position, regardless of variation among respective flow-rate adjustable valves.

Solution to Problem

The present invention is a flow-rate adjustable valve for adjusting a flow rate of liquid flowing through a flow path, the flow-rate adjustable valve including: a rotatable member; a lifter linearly movable by a rotation of the rotatable member; a valve body linearly movable by a linear movement of the lifter; a stopper configured to restrict a movable range of the lifter in a fixed state of the stopper in which a position of the stopper is not able to be changed; and a stopper-holding member configured to hold the stopper selectively in the fixed state or in a provisional fixed state in which the position of the stopper is able to be changed.

According to the above feature, since the stopper is selectively held either in the fixed state in which the position of the stopper is not able to be changed or in the provisional fixed state in which the position of the stopper is able to be changed, the position of the stopper can be changed while the stopper is held in the provisional fixed state. Specifically, for example, after the stopper has been held by the stopper-holding member in the provisional fixed state in which the position of the stopper is able to be changed, a water-stop area is adjusted by carrying out one or more water-passing and water-stop trials while changing the position of the stopper. Thereafter, it is possible to hold the stopper by the stopper-holding member in the fixed state in which the position of the stopper is not able to be changed. Thereby, a stroke of a valve body for each flow-rate adjustable valve can be adjusted so as to achieve a suitable closed-valve position, regardless of variation among respective flow-rate adjustable valves.

That is to say, it is preferable that a range, within which the position of the stopper is able to be changed in the provisional fixed state, includes a water-stop area.

In this case, after the stopper has been held by the stopper-holding member in the provisional fixed state in which the position of the stopper is able to be changed, a water-stop area is adjusted by carrying out one or more water-passing and water-stop trials while changing the position of the stopper. Thereafter, it is possible to hold the stopper by the stopper-holding member in the fixed state in which the position of the stopper is not able to be changed. Thereby, a stroke of a valve body for each flow-rate adjustable valve can be adjusted so as to achieve a suitable closed-valve position, regardless of variation among respective flow-rate adjustable valves.

In addition, it is preferable that at least a part of the stopper is exposed outside when the stopper-holding member holds the stopper in the provisional fixed state.

In this case, it is easy to change the position of the stopper by engaging with the at least part of the stopper exposed outside. Furthermore, it is preferable that the at least part of the stopper is a knob for an adjustment operation.

In addition, it is preferable that a scale associated with the provisional fixed state of the stopper is viewable from outside when the stopper-holding member holds the stopper in the provisional fixed state.

In this case, the operator can look at the scale and use it from outside while adjusting the water-stop area. Thereby, an adjustment operation for the water-stop area or the like by changing the position of the stopper is easy.

In addition, it is preferable that the lifter is configured to rotate by the rotation of the rotatable member, the lifter is provided with a protrusion, a guiding slope is provided, which is configured to abut on the protrusion of the lifter and to guide the protrusion of the lifter in a rotational axis direction by a rotation of the lifter so as to move the lifter in the rotational axis direction, and the stopper is configured to restrict the movable range of the lifter to a range less than 360 degrees.

In this case, it is possible to set a larger feed angle (an axially feed amount relative to a rotational angle), compared with a conventional screw type of lifter, which is rotated more than 360 degrees. Thereby, conversion of a rotational movement into an axial movement can be suitably achieved. That is to say, the valve body can be moved to a great extent by a slight rotation, which improves responsiveness.

In addition, it is preferable that the rotatable member has a coupling member configured to engage with the lifter in a rotational direction thereof and to transmit the rotation thereof to the lifter, the coupling member has a stopper-restricting part that projects outward, and the stopper has a pillar-like shape which has a substantially C-shaped section, encloses at least a part of an outer periphery of the coupling member, and restricts a movable range of the stopper-restricting part of the coupling member so as to restrict the movable range of the lifter.

In this case, it is easy to restrict the movable range of the lifter to a range of less than 360 degrees. In addition, the space occupied by the stopper that encloses the at least part of the periphery of the coupling member is small, which achieves space-saving and reduces the costs of the stopper.

Furthermore, in this case, it is more preferable that the stopper is switched to the fixed state when both ends in an axial direction of the stopper are compressed and the substantially C-shaped section of the stopper is enlarged.

According to this feature, the resilient force of the compressed and enlarged stopper acts to return the stopper to its original shape. That is to say, the resilient force acts to contract the substantially C-shaped section of the stopper as well as extend the axial length of the stopper. As a result, the compressing force is increased, which makes the fixed state more stable. In addition, it is possible to flexibly design a structure for switching the stopper between the provisional fixed state and the fixed state. Thus, it is possible to achieve such a structure at low costs.

Furthermore, in this case, it is more preferable that the rotatable member is a rotational shaft of a motor, the stopper is configured to be compressed by a casing member arranged on an outer-periphery side of the lifter and a cover member fixed to a housing of the motor, and a fastening member for fastening the casing member and the cover member is further provided.

According to this feature, the cover member serves as both the structure for switching the stopper between the provisional fixed state and the fixed state and the structure for fixing the motor. Thus, the increase of the number of parts is inhibited.

Alternatively, it is preferable that the flow-rate adjustable valve of the present invention further includes a casing member configured to contain the lifter, a cover member configured to cover the casing member from upward, and a fastening member configured to fasten the casing member and the cover member, wherein at least a part of the stopper is compressed by the casing member and the cover member such that the stopper is switched to the fixed state.

In this case, the at least part of the stopper is fixed by being compressed by the casing member and the cover member in an up-and-down direction. This reduces the possibility that the stopper may move undesirably after the stopper has been fixed. In addition, the number of parts can be made smaller.

In this case as well, it is more preferable that the stopper has a pillar-like shape which has a substantially C-shaped section, and the stopper is switched to the fixed state when both ends in an axial direction of the stopper are compressed and the substantially C-shaped section of the stopper is enlarged.

According to this feature, the space occupied by the stopper is small, which achieves space-saving and reduces the costs of the stopper. In addition, the resilient force of the compressed and enlarged stopper acts to return the stopper to its original shape. That is to say, the resilient force acts to contract the substantially C-shaped section of the stopper as well as extend the axial length of the stopper. As a result, the compressing force is increased, which makes the fixed state more stable. In addition, it is possible to flexibly design a structure for switching the stopper between the provisional fixed state and the fixed state. Thus, it is possible to achieve such a structure at low costs.

In this case, it is more preferable that the rotatable member is a rotational shaft of a motor, the casing member is arranged on an outer-periphery side of the lifter, the cover member is fixed to a housing of the motor, and the stopper is configured to be compressed by the casing member and the cover member.

According to this feature, the cover member serves as both the structure for switching the stopper between the provisional fixed state and the fixed state and the structure for fixing the motor. Thus, the increase of the number of parts is inhibited.

In addition, it is preferable that the rotatable member is a rotational shaft of a stepping motor.

According to this feature, the flow-rate control can be achieved by a computer control (digital control). In addition, even if a small flow rate is controlled, water of the controlled small flow rate can be stably supplied by finely controlling the stepping motor.

In addition to the above features, it is preferable that the fastening member includes one or more screw members, and a rotational axis of each screw member is offset from an axis of the stopper.

According to this feature, it is inhibited that the stopper is undesirably rotated by an operational force for rotating each screw member. That is to say, when each screw member is operated, it is prevented that the stopper is undesirably rotated and the position of the stopper is undesirably changed.

In addition, it is preferable that at least one of both ends in an axial direction of the stopper is provided with inclination in which a length in the axial direction thereof is greater at an outer portion.

According to this feature, the stopper is stable in a compressed and enlarged state thereof. Thus, decentering of the stopper is inhibited, which makes more stable the fixed state of the stopper in which the position of the stopper is not able to be changed.

In addition, it is preferable that a surface of a member configured to compress one end in an axial direction of the stopper is provided with inclination in which a length in the axial direction thereof is smaller at an outer portion.

According to this feature as well, the stopper is stable in a compressed and enlarged state thereof. Thus, decentering of the stopper is inhibited, which makes more stable the fixed state of the stopper in which the position of the stopper is not able to be changed.

In addition, the present invention is a combination faucet for hot and cold water comprising two flow-rate adjustable valves, each of which includes any of the above features, wherein one of the two flow-rate adjustable valves is connected to a cold water supply, and the other of the two flow-rate adjustable valves is connected to a hot water supply.

According to this combination faucet, it is possible to mix hot water and cold water stably.

In addition, the present invention is a method of manufacturing the flow-rate adjustable valve including any of the above features, the method including: a provisionally fixing step of holding the stopper by the stopper-holding member in the provisional fixed state in which the position of the stopper is able to be changed; an adjusting step of adjusting a water-stop area by carrying out one or more water-passing and water-stop trials while changing the position of the stopper, under the condition in which the stopper is held in the provisional fixed state; and a fixing step of holding the stopper by the stopper-holding member in the fixed state in which the position of the stopper is not able to be changed, after the adjusting step.

According to this method, a stroke of a valve body for each flow-rate adjustable valve can be adjusted so as to achieve a suitable closed-valve position, regardless of variation among respective flow-rate adjustable valves.

In addition, the present invention is a method of manufacturing the flow-rate adjustable valve including the above coupling member the method including: a provisionally fixing step of holding the stopper by the stopper-holding member in the provisional fixed state in which the position of the stopper is able to be changed; an adjusting step of adjusting a water-stop area by carrying out one or more water-passing and water-stop trials while changing the position of the stopper together with the coupling member, under the condition in which the stopper is held in the provisional fixed state; and a fixing step of holding the stopper by the stopper-holding member in the fixed state in which the position of the stopper is not able to be changed, after the adjusting step.

According to this method as well, a stroke of a valve body for each flow-rate adjustable valve can be adjusted so as to achieve a suitable closed-valve position, regardless of variation among respective flow-rate adjustable valves.

Herein, the valve body may be a main valve body of the flow-rate adjustable valve (which may not include a pilot valve body). Alternatively, the valve body may be a pilot valve body, which moves a main valve body by using a pressure in a back pressure chamber.

Advantageous Effects of Invention

According to the above feature, since the stopper is selectively held either in the fixed state in which the position of the stopper is not able to be changed or in the provisional fixed state in which the position of the stopper is able to be changed, the position of the stopper can be changed while the stopper is held in the provisional fixed state. Specifically, for example, after the stopper has been held by the stopper-holding member in the provisional fixed state in which the position of the stopper is able to be changed, a water-stop area is adjusted by carrying out one or more water-passing and water-stop trials while changing the position of the stopper. Thereafter, it is possible to hold the stopper by the stopper-holding member in the fixed state in which the position of the stopper is not able to be changed. Thereby, a stroke of a valve body for each flow-rate adjustable valve can be adjusted so as to achieve a suitable closed-valve position, regardless of variation among respective flow-rate adjustable valves.

DESCRIPTION OF EMBODIMENTS

With reference to the attached drawings, we explain a flow-rate adjustable valve according to an embodiment of the present invention.
[Entire Structure]

Figure 1:
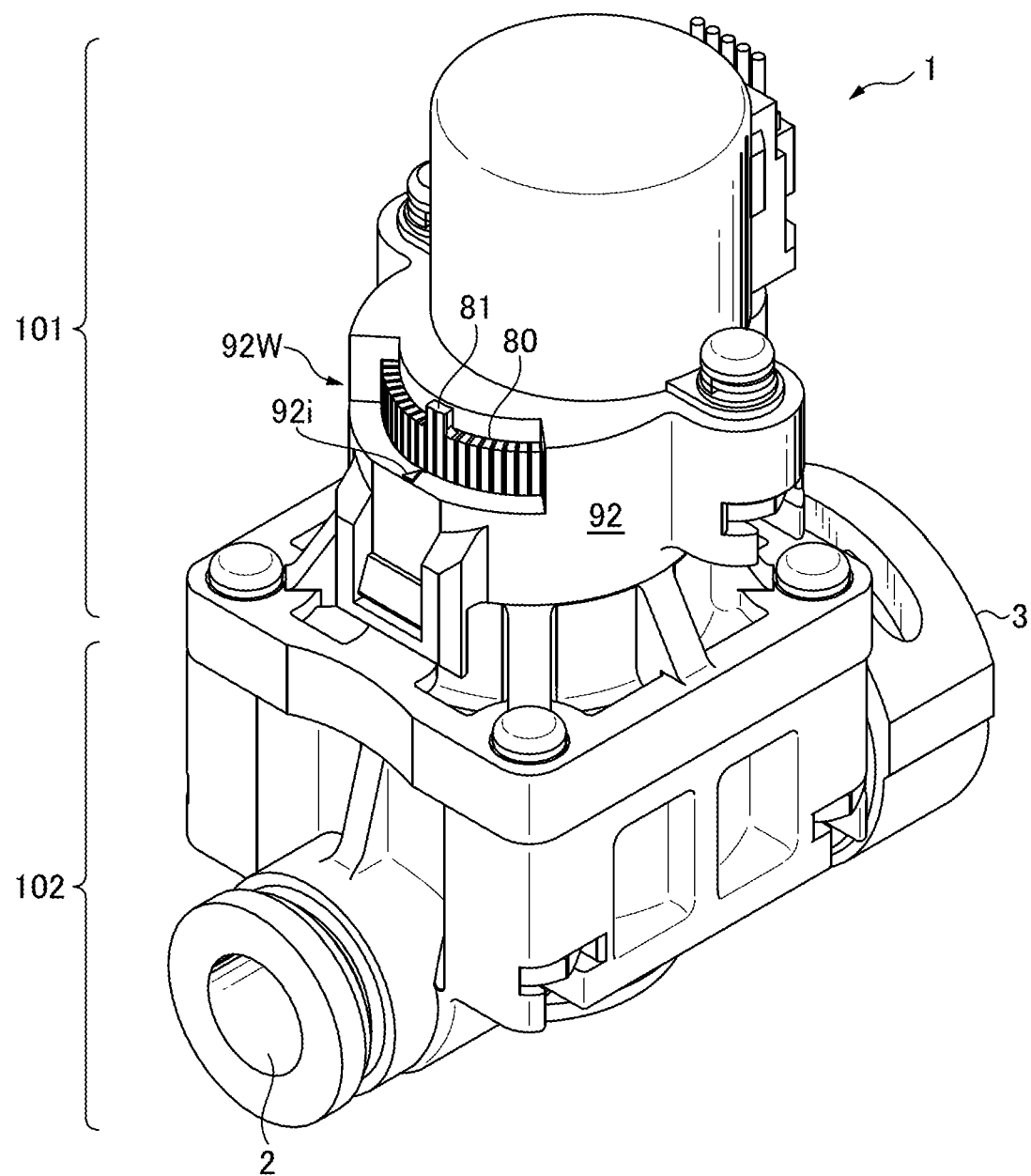
FIG. 1 is a perspective view of a flow-rate adjustable valve according to an embodiment of the present invention.
Figure 2:
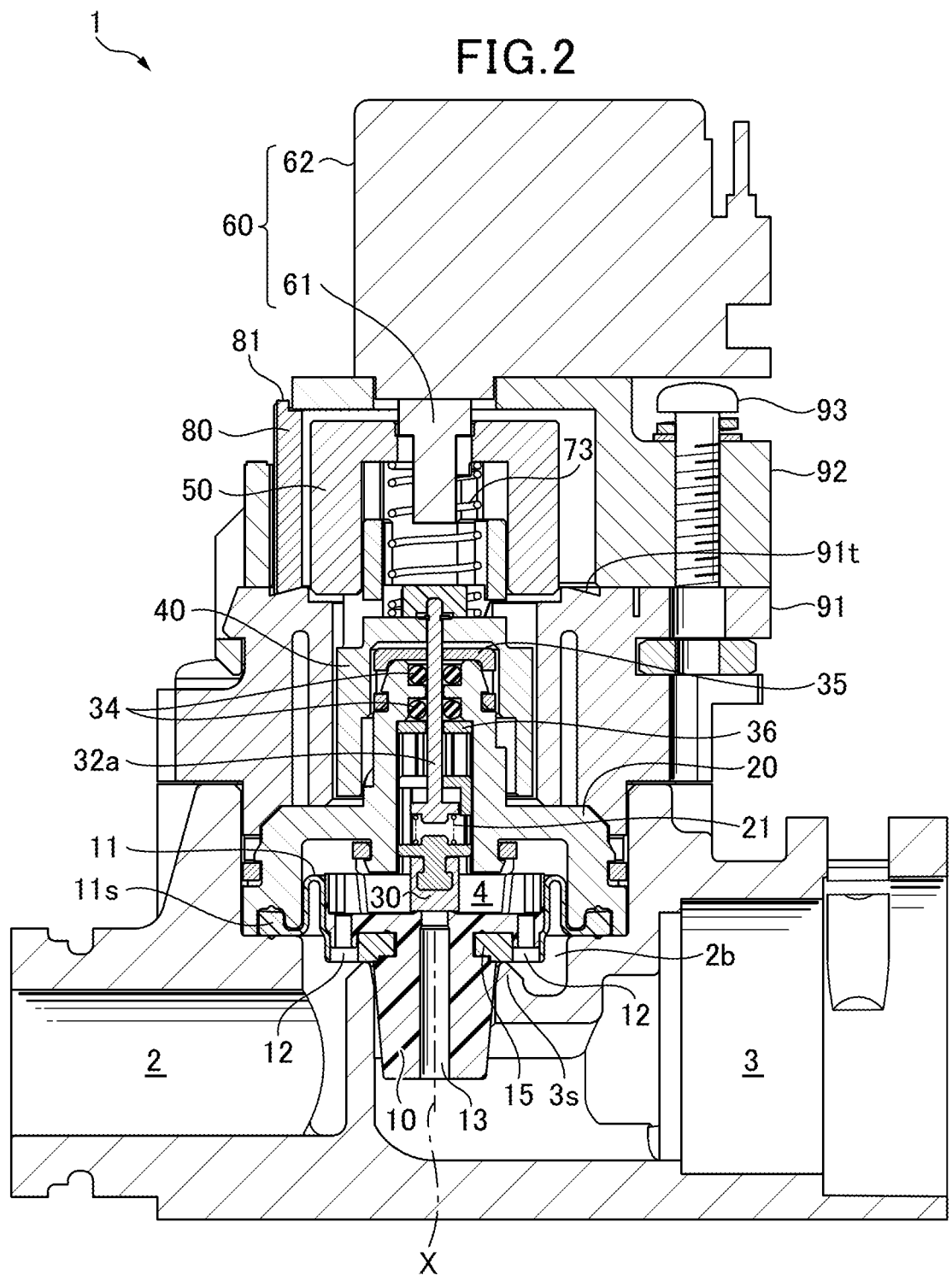
FIG. 2 is a longitudinal section view of the flow-rate adjustable valve of FIG. 1 under a condition in which the flow-rate adjustable valve is closed.
Figure 3:
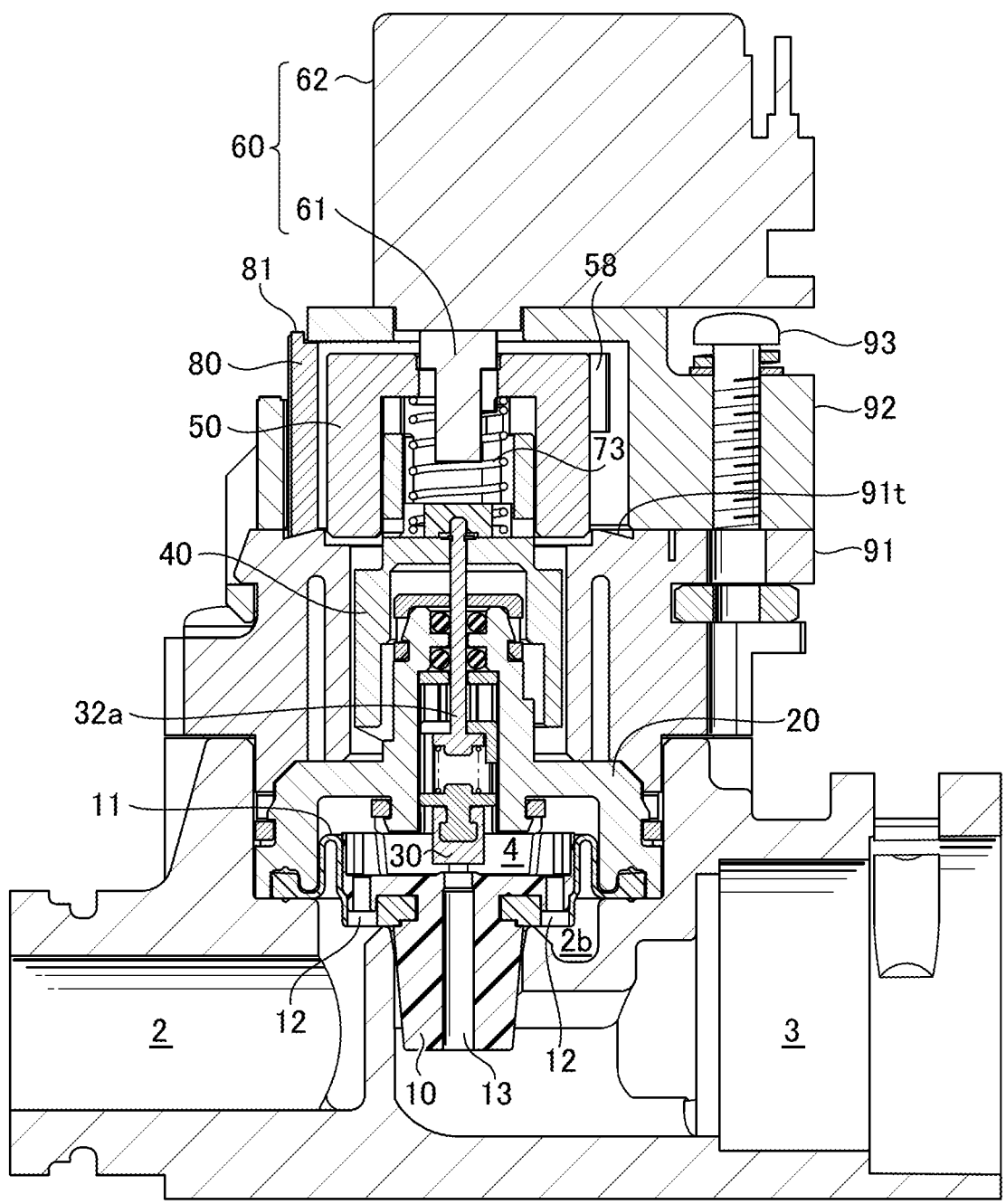
FIG. 3 is a longitudinal section view of the flow-rate adjustable valve of FIG. 1 under a condition just after the flow-rate adjustable valve is opened.
Figure 4:
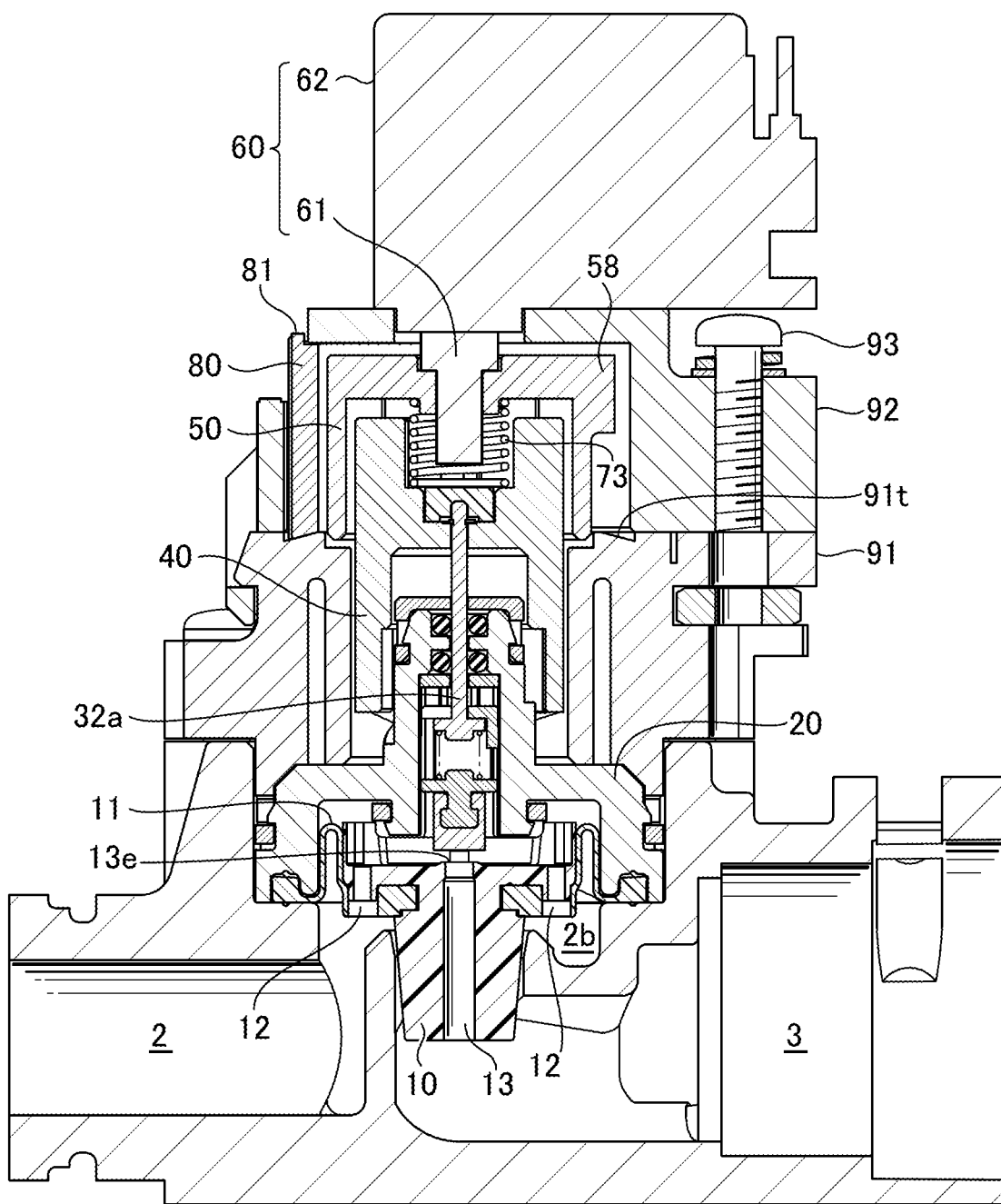
FIG. 4 is a longitudinal section view of the flow-rate adjustable valve of FIG. 1 under a condition in which flow-rate adjustable valve is opened.

FIG. 1 is a perspective view of a flow-rate adjustable valve according to an embodiment of the present invention. FIGS. 2 to 4 are longitudinal section views of the flow-rate adjustable valve of FIG. 1. FIG. 2 shows a condition in which the flow-rate adjustable valve is closed, FIG. 3 shows a condition just after the flow-rate adjustable valve is opened, and FIG. 4 shows a condition in which flow-rate adjustable valve is opened.

As shown in FIGS. 1 to 4, the flow-rate adjustable valve 1 of the present embodiment is configured to adjust a flow rate of liquid flowing through a flow path 2, 3. In general, the liquid is cold water or hot water. In FIGS. 2 to 4, the flow path 2, 3 extends in a right-left direction. However, in the actual flow-rate adjustable valve 1, it is intended that the flow path 2, 3 extends in a vertical direction. Specifically, it is intended that an upstream side of the path 2 is located at a vertical lower area, and that a downstream side of the path 3 is located at a vertical upper area.

As shown in FIGS. 2 to 4, the flow-rate adjustable valve 1 of the present embodiment includes a main valve body 10 movably supported in the downstream side of the flow path 3 via a diaphragm membrane 11, which is an elastic member. The diaphragm membrane 11 and the main valve body 10 are integrally made of a resin.

A back-pressure-chamber forming member 20 is provided on an opposite side of the flow path 3 with respect to the main valve body 10. A back pressure chamber 4 is formed by the back-pressure-chamber forming member 20 and the main valve body 10. The liquid (cold water and/or hot water) is adapted to be supplied from the upstream side of the flow path 2 to the back pressure chamber 4 at a predetermined pressure, and to be contained in the back pressure chamber 4. Then, a biasing force is generated in a valve-closing direction for closing the main valve body 10 by the supplied liquid.

[Main Valve Body 10]

The main valve body 10 of the present embodiment has the substantially symmetric shape around the axis X of the main valve body 10, and the center of gravity of the main valve body 10 is located on the axis X.

The main valve body 10 of the present embodiment has a contact part 15, which comes in contact with a valve seat 3s of the flow path 3 when the main valve body 10 is seated on the downstream side of the flow path 3 so as to close the valve 1. The contact part 15 is made of a hard material, which is harder than a material for the other parts of the main valve body 10.

Figure 5:
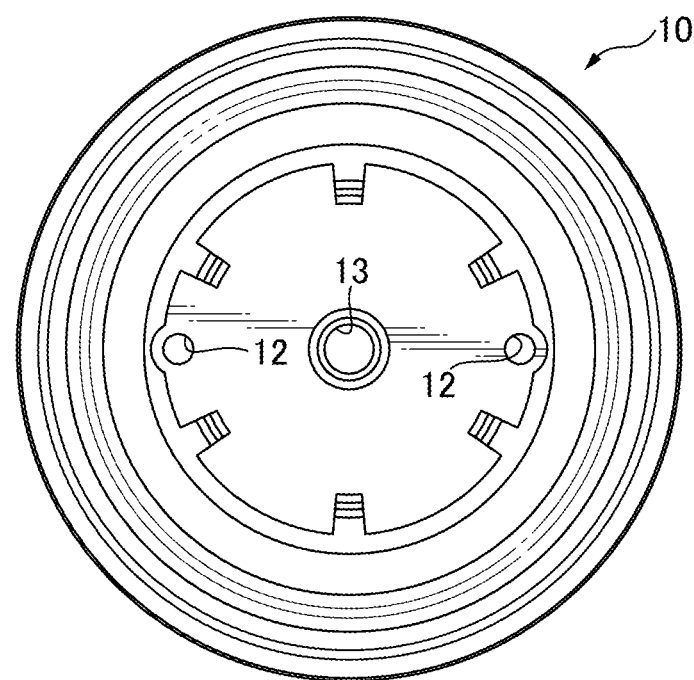
FIG. 5 is an enlarged plan view of a main valve body of the flow-rate adjustable valve of FIG. 1.

In the preset embodiment, two inlet holes 12 are provided in the main valve body 10 for communicating the upstream side of the flow path 2 and the back pressure chamber 4. The two inlet holes 12 are arranged in one pair, and located at positions symmetric with respect to the axis X of the main valve body 10. FIG. 5 shows a plan view of the main valve body 10. Correspondingly to this arrangement of the two inlet holes 12, the upstream side of the flow path 2 has a bypassing flow path 2b, which leads to the inlet hole 12 located above the downstream side of the path 3 (in FIGS. 2 to 4). In addition, as shown in FIGS. 2 to 4, each of the two inlet holes 12 is provided as a straight channel having a circular section.

Based on the above arrangement, the flow-rate adjustable valve 1 of the present invention is installed to the flow path 2, 3 which extends vertically. That is to say, when the main valve body 10 is arranged in such a manner that a direction in which the main valve body 10 is opened and closed is horizontal, one of the two inlet holes 12 is arranged in an upper area with respect to the axis X of the main valve body 10, and the other one of the two inlet holes 12 is arranged in a lower area with respect to the axis X of the main valve body 10.

In addition, in the present embodiment, one outlet hole 13 is provided in the main valve body 10 for communicating the downstream side of the flow path 3 and the back pressure chamber 4. The outlet hole 13 is located on the axis X of the main valve body 10 as a straight channel having a circular section.
[Elongated Member 32]

The pilot valve body 30 for opening and closing an end 13e of the outlet hole 13 on the side of the back pressure chamber 4 (see FIG. 4) is held by an elongated member 32. Thereby, the pilot valve body 30 is movable by the elongated member 32 in an axial direction of the elongated member 32.

Figure 6:
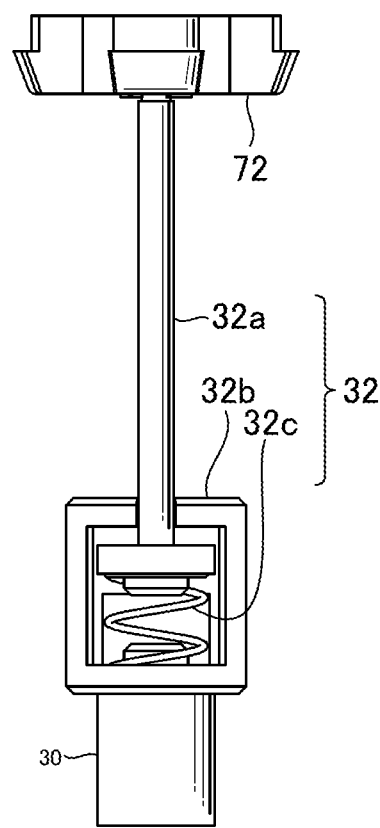
FIG. 6 is a front view of a pilot valve body, an elongated member, a biasing-connecting member and an E-shaped ring extracted from the flow-rate adjustable valve of FIG. 1.
Figure 7:
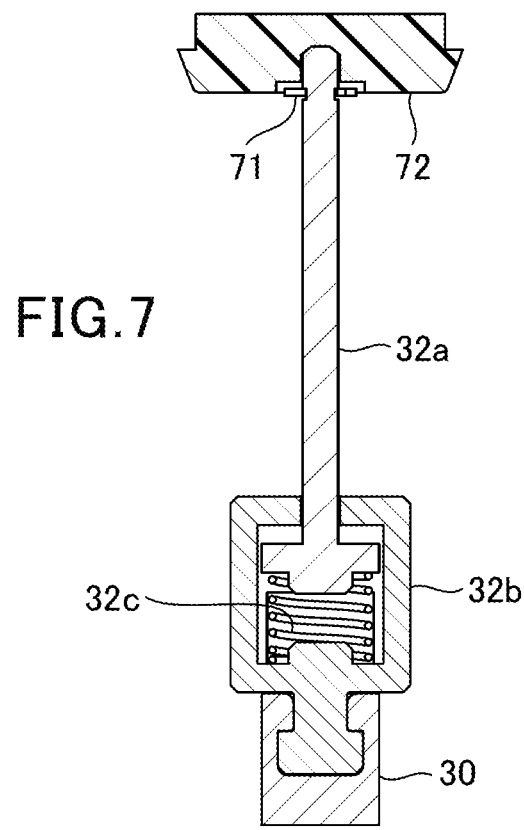
FIG. 7 is a longitudinal section view of the pilot valve body, the elongated member, the biasing-connecting member and the E-shaped ring extracted from the flow-rate adjustable valve of FIG. 1.
Figure 8:
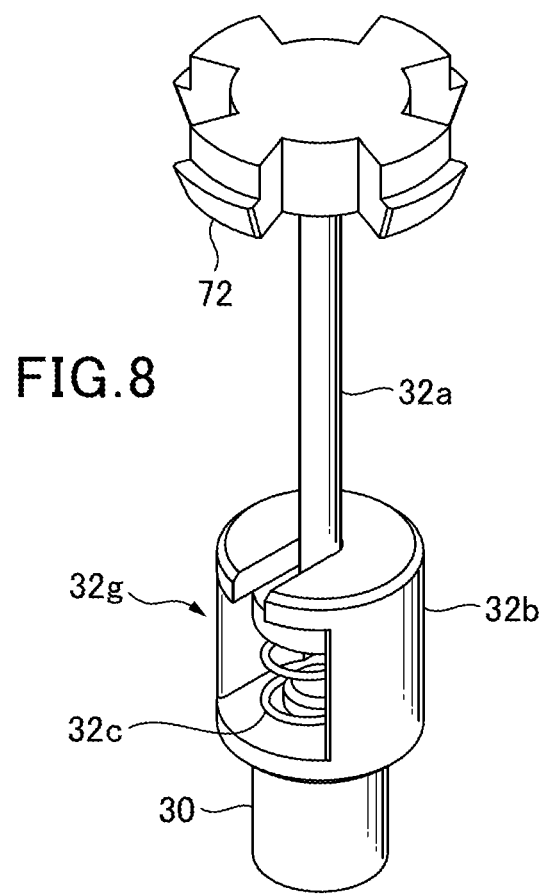
FIG. 8 is a perspective view of the pilot valve body, the elongated member, the biasing-connecting member and the E-shaped ring extracted from the flow-rate adjustable valve of FIG. 1, as seen diagonally from upside.
Figure 9:
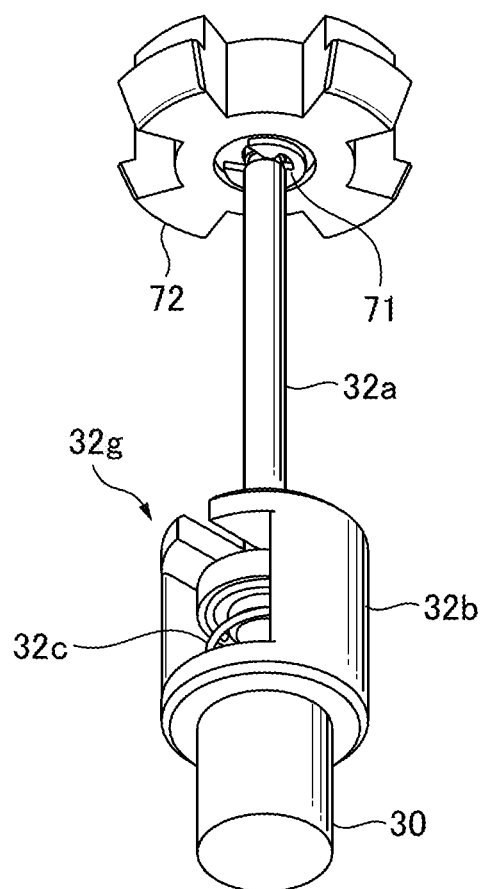
FIG. 9 is another perspective view of the pilot valve body, the elongated member, the biasing-connecting member and the E-shaped ring extracted from the flow-rate adjustable valve of FIG. 1, as seen diagonally from downside.
Figure 10:
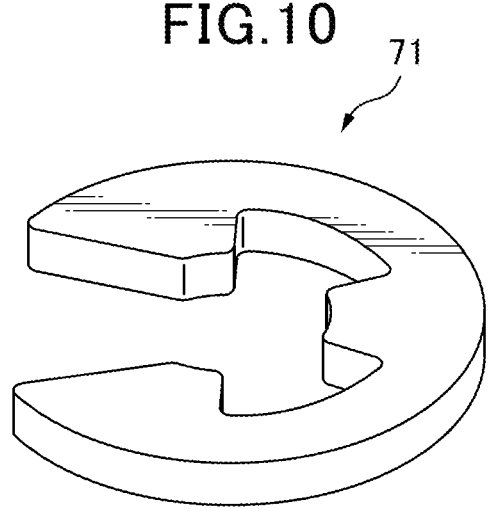
FIG. 10 is an enlarged perspective view of the E-shaped ring of the flow-rate adjustable valve of FIG. 1.

The pilot valve body 30, the elongated member 32, an elastic resin member 72 as a biasing-connecting member, which connects the elongated member 32 and a lifter 40 under a condition in which the elongated member 32 is biased to the lifter 40 in a one-way direction of the axial direction, and an E-shaped ring 71 as a retaining mechanism, which engages the elongated member 32 and the lifter 40, are extracted and shown in FIGS. 6 to 9. FIG. 6 is a front view of these elements in their assembled state. FIG. 7 is a longitudinal section view of these elements in their assembled state. FIG. 8 is a perspective view of these elements in their assembled state, as seen diagonally from upside. FIG. 9 is a perspective view of these elements in their assembled state, as seen diagonally from downside. FIG. 10 is an enlarged perspective view of the E-shaped ring 71.

As shown in FIGS. 2 to 9, the elongated member 32 of the present embodiment has a shaft member 32a including an area passing through the back-pressure-chamber forming member 20 via a water-tight seal consisting of two O-rings 34, and a distal-end member 32b holding the pilot valve body 30 by adhesive connection or press-fitting.

As shown in FIGS. 6 and 7, the distal-end member 32b is connected to the shaft member 32a in such a manner that the distal-end member 32b is slidably movable to the shaft member 32a within a predetermined range in the axial direction. Specifically, an upper area of the distal-end member 32b extends further upward (in FIGS. 2 to 9) so as to enclose the shaft member 32a, and guides the sliding movement between the shaft member 32a and the distal-end member 32b. Herein, an elastic member 32c is interposed between the shaft member 32a and the distal-end member 32b, for biasing the shaft member 32a and the distal-end member 32b in a direction away from each other. In the present embodiment, the elastic member 32c is a coil spring.

As shown in FIGS. 8 and 9, a flow path 32g for the liquid is formed on a radially outer surface of the distal-end member 32b.

As shown in FIGS. 2 to 4, the shaft member 32a extends continuously both through a region on the side of the back pressure chamber 4, in which the liquid can exist, and through an atmospheric region, in which the liquid cannot exits, via the water-tight seal 34. In addition, the cross sectional area of the shaft member 32a, in particular the cross sectional area thereof at the part passing through the water-tight seal 34, is smaller than an opened area of the end 13e of the outlet hole 13 on the side of the back pressure chamber 4. In the present embodiment, the cross-section shape of the shaft member 32a is a constant circle. A first spacer member 35 is provided on the outer (atmospheric) side of the water-tight seal 34 in order to guide the shaft member 32a when the shaft member 32a is moved in the axial direction. A second spacer member 36 is also provided on the inner (back-pressure-chamber) side of the water tight seal 34 in order to guide the shaft member 32a when the shaft member 32a is moved in the axial direction. As shown in FIG. 2, the second spacer member 36 also extends in a hollow part 21 of the back-pressure-chamber forming member 20. The second spacer member 36 has a function of guiding the distal-end member 32b in the hollow part 21 as well.

[Stepping Motor 60]

Next, the structure configured to cause the shaft member 32a to move in the axial direction is explained. In the present embodiment, a stepping motor 60 is used for causing the shaft member 32a to move.

The stepping motor 60 in the present embodiment is a common stepping motor having a rotation shaft 61, which is exposed outside a housing 62 and is driven to rotate. The rotation shaft 61 is jointed to a rotation shaft receiving part 56 of a coupling member 50 as shown in FIGS. 11 to 15. That is, the coupling member 50 is integrally rotated together with the rotation shaft 61.

[Coupling Member 50]

Figure 11:
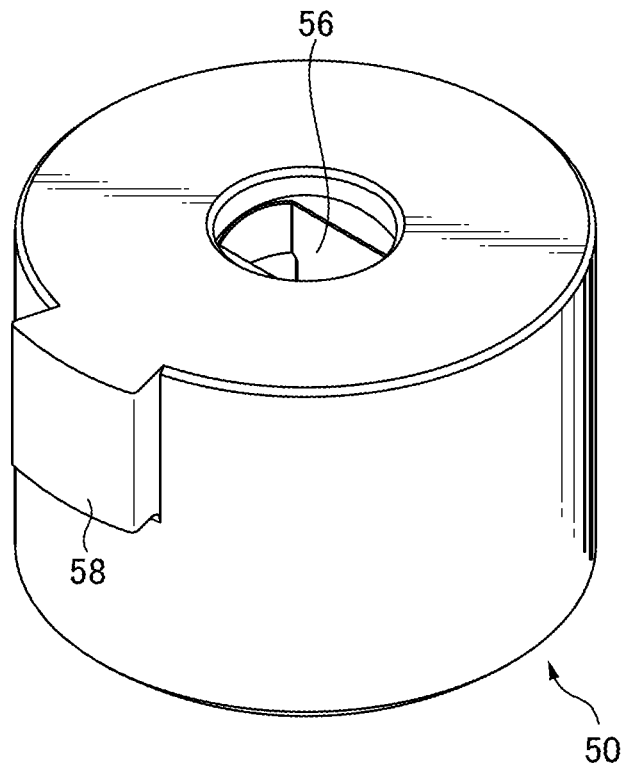
FIG. 11 is a perspective view of a coupling member of the flow-rate adjustable valve of FIG. 1.
Figure 12:
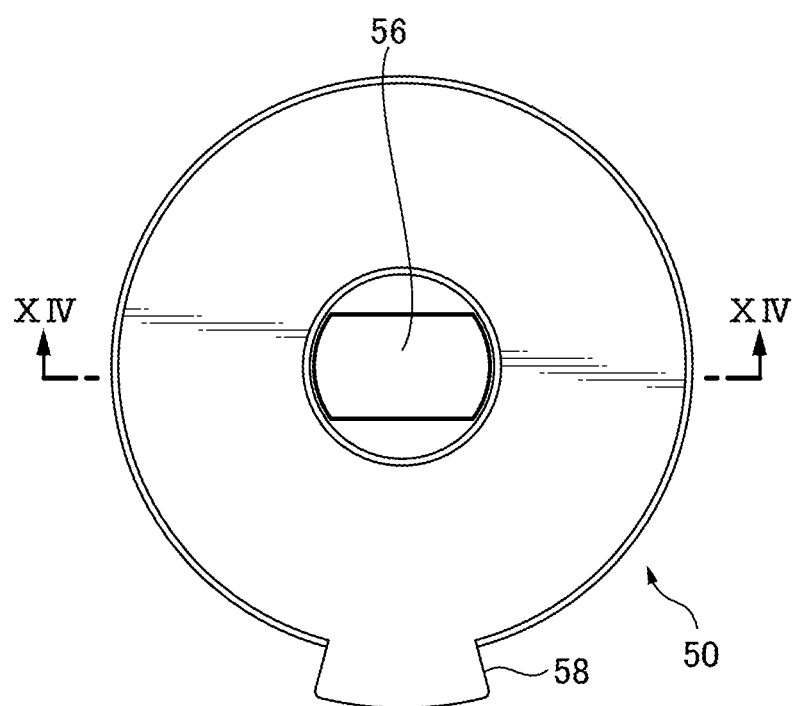
FIG. 12 is a plan view of the coupling member of FIG. 11.
Figure 13:
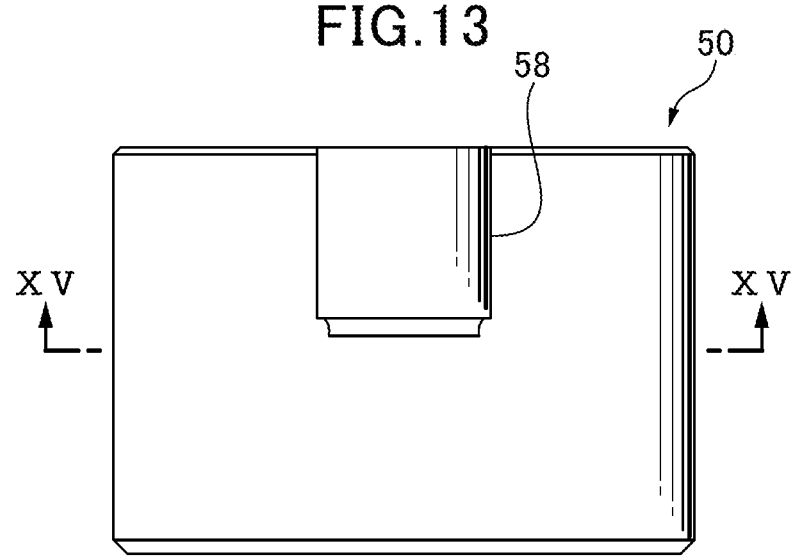
FIG. 13 is a front view of the coupling member of FIG. 11.

FIG. 11 is a perspective view of the coupling member 50, FIG. 12 is a plan view of the coupling member 50, and FIG. 13 is a front view of the coupling member 50. As shown in FIGS. 11 to 13, the coupling member 50 is provided with a stopper-restricting part 58 projecting radially outward.

Figure 14:
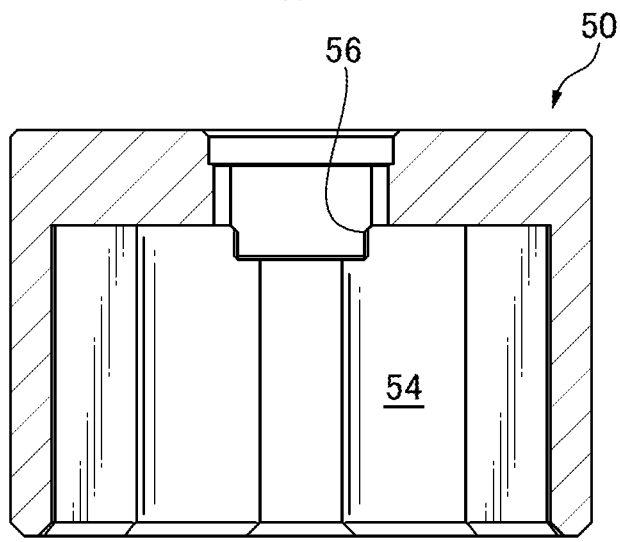
FIG. 14 is a cross section view taken along plane (line) XIV-XIV of FIG. 12.
Figure 15:
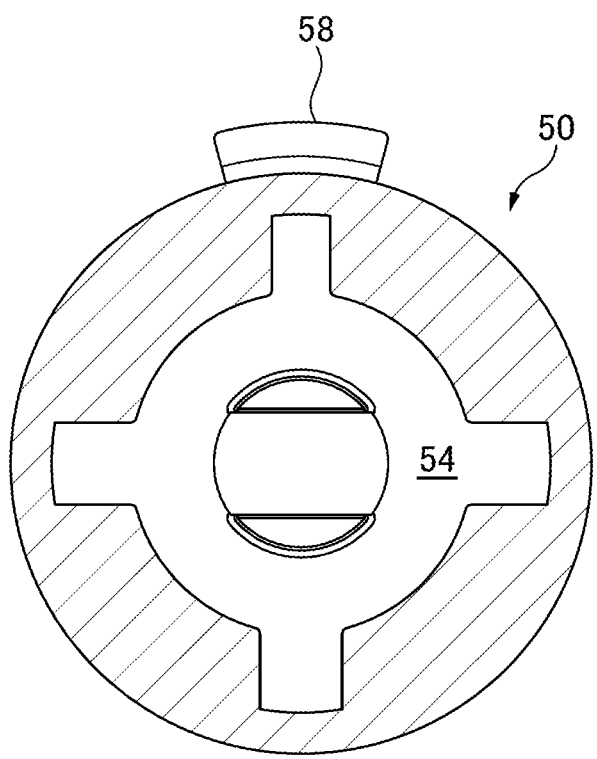
FIG. 15 is a cross section view taken along plane (line) XV-XV of FIG. 13.

FIG. 14 is a cross section view taken along plane (line) XIV-XIV of FIG. 12, and FIG. 15 is a cross section view taken along plane (line) XV-XV of FIG. 13. As shown in FIGS. 14 and 15, a tubular fitting hole 54 extending in the axial direction and having a substantially crisscross section is provided in the inside of the coupling member 50.

Figure 16:
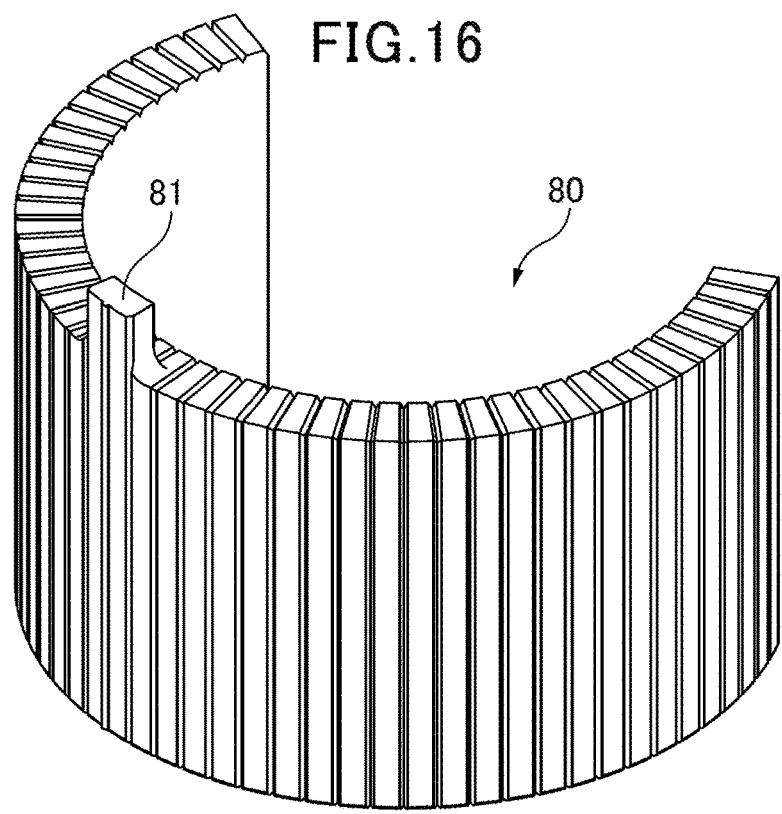
FIG. 16 is a perspective view of a stopper of the flow-rate adjustable valve of FIG. 1.
Figure 17:
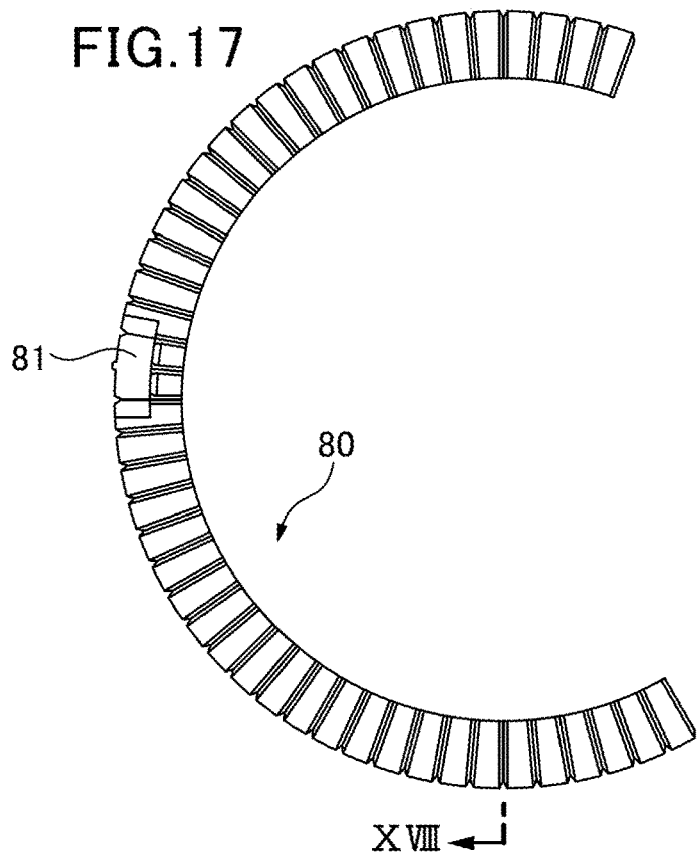
FIG. 17 is a plan view of the stopper of FIG. 16.
Figure 18:
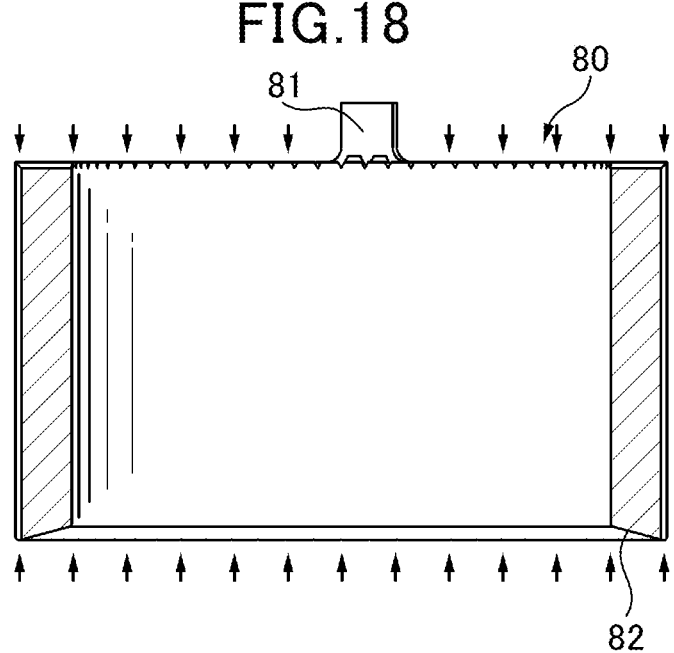
FIG. 18 is a cross section view taken along plane (line) XIII-XIII of FIG. 17.

As shown in FIGS. 16 to 18, a pillar-like stopper 80 having a substantially C-shaped section is provided to enclose a part of the outer periphery of the coupling member 50. FIG. 16 is a perspective view of the stopper 80, FIG. 17 is a plan view of the stopper 80, and FIG. 18 is a cross section view taken along plane (line) XIII-XIII of FIG. 17. The stopper 80 has a function of restricting a rotatable range of the stopper-restricting part 58 of the coupling member 50 to a predetermined range (for example a range of 90 degrees). The stopper 80 is explained in detail later.

[Lifter 40]

Figure 19:
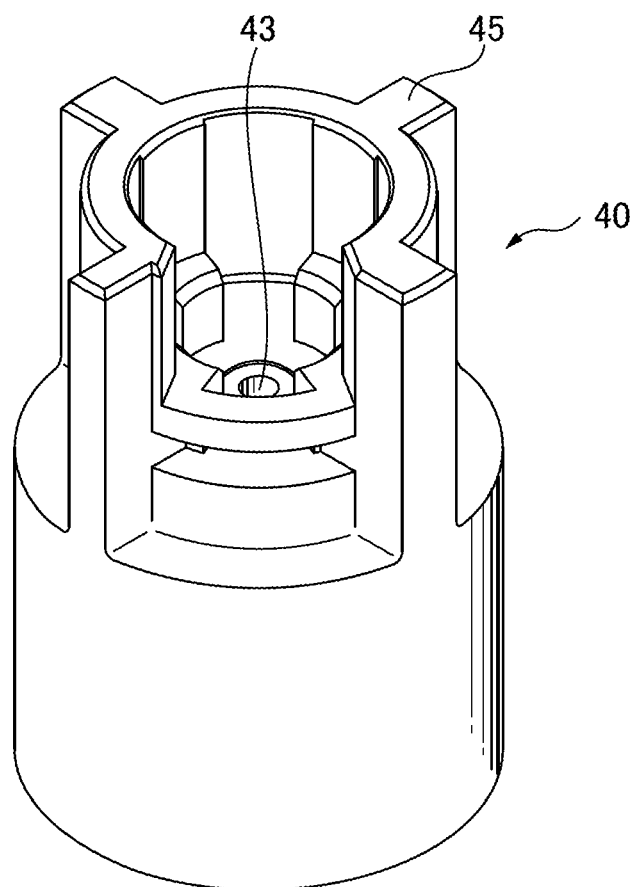
FIG. 19 is a perspective view of a lifter of the flow-rate adjustable valve of FIG. 1, as seen diagonally from upside.
Figure 20:
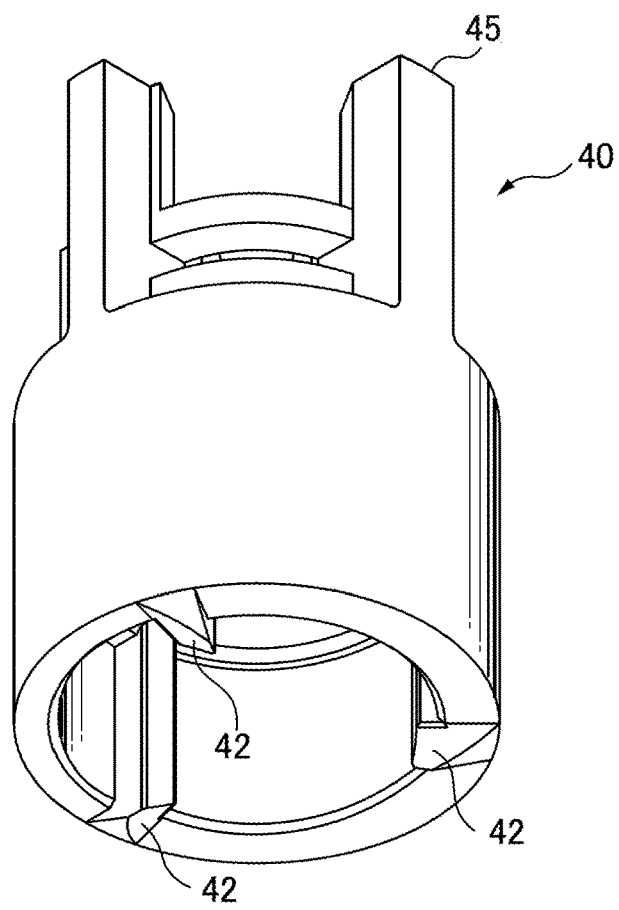
FIG. 20 is a perspective view of the lifter of FIG. 19, as seen diagonally from downside.
Figure 21:
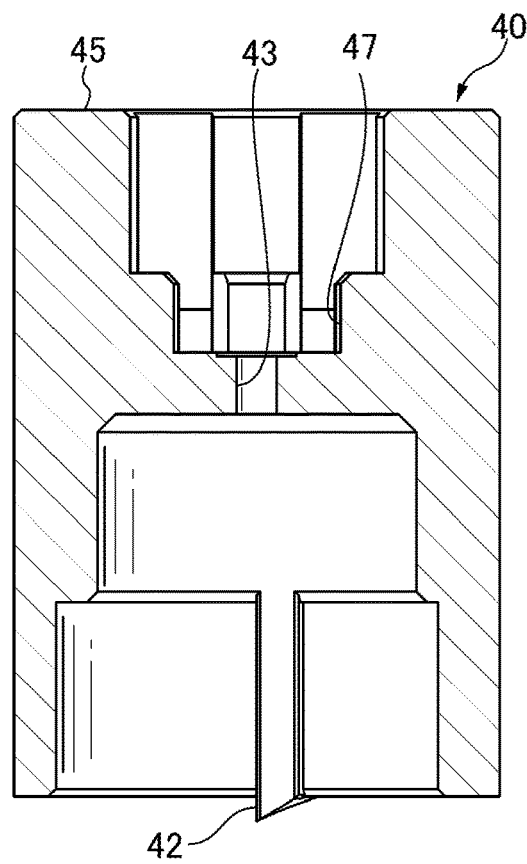
FIG. 21 is a longitudinal section view of the lifter of FIG. 19.

FIGS. 19 to 21 show the lifter 40 of the present embodiment. FIG. 19 is a perspective view of the 40 as seen diagonally from upside, FIG. 20 is a perspective view of the lifter 40 as seen diagonally from downside, and FIG. 21 is a longitudinal section view of the lifter 40.

As shown in FIGS. 19 to 21, the lifter 40 of the present embodiment is provided with a fitting concave part 45 at an upper portion thereof. The fitting concave part 45 is tubular and has a substantially crisscross section. The fitting concave part 45 is contained in the fitting hole 54 of the coupling member 50, so that the coupling member 50 and the lifter 40 are engaged in the rotational direction and are guided during their relative axial movement. Regarding the relative axial movement, as shown in FIGS. 2 to 4, a coil spring 73 is interposed between the coupling member 50 and the lifter 40 as a biasing member, so that the lifter 40 is always biased in a direction away from the coupling member 50 (i.e., the rotation shaft 61 (rotatable member)) toward the side of the back pressure chamber 4.

A lower portion of the lifter 40 of the present embodiment is formed to have a substantially hollow cylindrical shape. Three protrusions 42 equally distributed in the rotational direction by 120 degrees are provided so that each of the three protrusions 42 protrudes (rises) inward and downward.

[Back-Pressure-Chamber Forming Member 20]

On the other hand, as shown in FIGS. 2 to 4, the back-pressure-chamber forming member 20 of the present embodiment has the hollow part 21, which is cylindrical and located on the axis X (on an extended line of the axis X) of the main valve body 10. The distal-end member 32b of the elongated member 32 is adapted to move in the axial direction in the hollow part 21.

Figure 22:
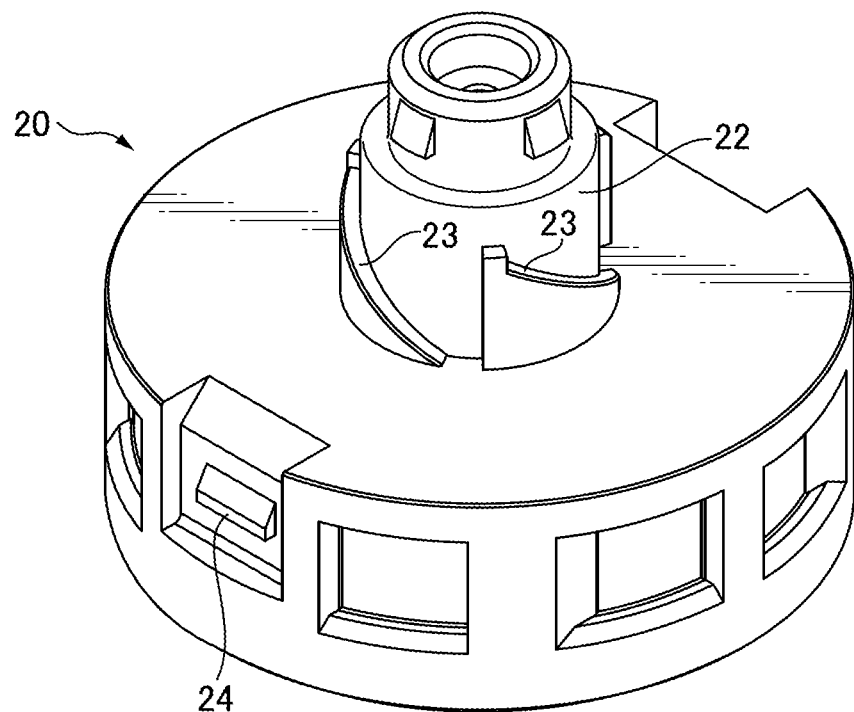
FIG. 22 is a perspective view of a back-pressure-chamber forming member of the flow-rate adjustable valve of FIG. 1.
Figure 23:
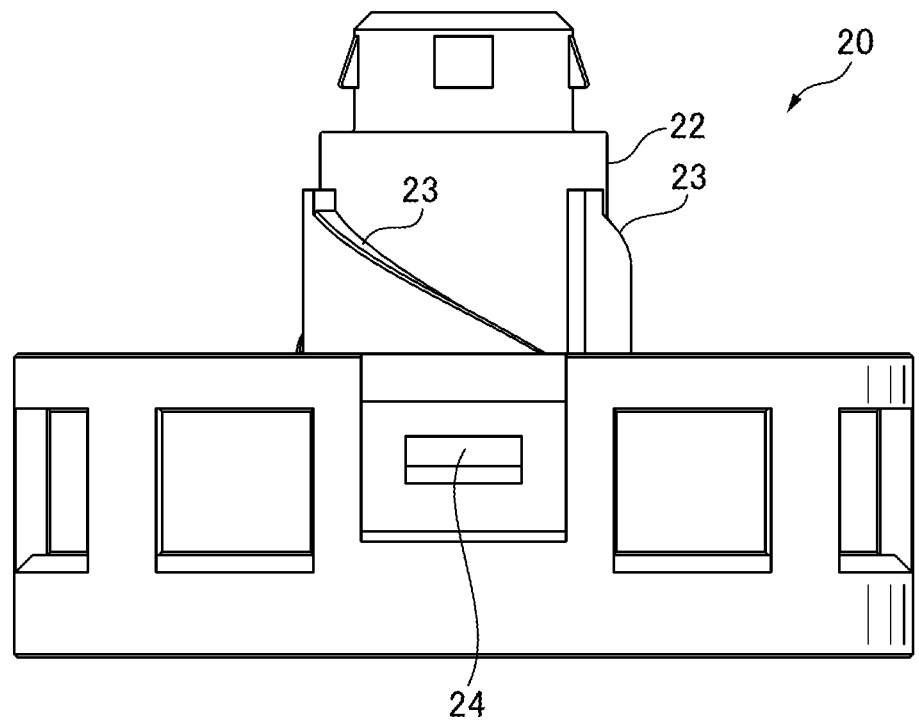
FIG. 23 is a front view of the back-pressure-chamber forming member of FIG. 22.

Herein, FIG. 22 is a perspective view of the back-pressure-chamber forming member 20 of the present embodiment, and FIG. 23 is a front view of the back-pressure-chamber forming member 20 of FIG. 21. As seen from FIGS. 22 and 23, the hollow part 21 is defined by an upper cylindrical part 22 of the back-pressure-chamber forming member 20. Then, three guiding slopes 23 are provided on the outer surface of the upper cylindrical part 22, which are configured to abut on the respective three protrusions 42 of the lifter 40 and to guide the respective three protrusions 42 of the lifter 40 in the axial direction by the rotation of the lifter 40 (together with the biasing force of the coil spring 73) so as to move the lifter 40 in the axial direction. In addition, a lower part of the back-pressure-chamber forming member 20 is provided with two engagement protrusions 24, which are configured to fit into a case member 91 described below.

The shaft member 32a is engaged in a shaft-member-receiving hole 43 (see FIGS. 19 and 21) of the lifter 40, which is axially movable based on the above structure. Specifically, as shown in FIGS. 2 to 4, the E-shaped ring 71 as a retaining mechanism is press-fitted to a position adjacent to the upper end of the shaft-member-receiving hole 43, and a cut part of the shaft member 32a is engaged with the E-shaped ring 71. The elastic resin member 72 as a biasing-connecting member is fitted into an elastic-resin-memberreceiving part 47 (see FIG. 21) of the lifter 40 under a condition in which the upper end of the shaft member 32a is biased toward the side of the back pressure chamber 4.

[The Other Members]

In the present embodiment, the rotation shaft 61 of the stepping motor 60 is always biased in the same rotational direction via the coupling member 50 by the coil spring 73 as a biasing member. Thereby, inside member(s) of the stepping motor 60 is biased (moved to one side) in the same rotational direction via the rotational shaft 61. The coil spring 73 is configured to bias the rotational shaft 61 with a rotational torque not more than a detent torque of the stepping motor 60.

In addition, an elastic force of the elastic member 32c of the elongated member 32 is smaller than an elastic force of the elastic resin member 72 as a biasing-connecting member.

[Basic Effects]

As shown in FIG. 2, under the condition in which the flow-rate adjustable valve 1 is closed, the main valve body 10 provided in the flow path 3 via the diaphragm membrane 11 is biased in a valve-closing direction for closing the main valve body 10 by a pressure of the liquid contained in the back pressures chamber 4 (whose pressure depends on a supply pressure of the liquid in the flow path 2).

When the flow-rate adjustable valve 1 is opened, the pilot valve body 30 is controlled to open the outlet hole 13 provided in the main valve body 10.

Specifically, the stepping motor 60 is driven to rotate, so that the coupling member 50 starts to be rotated together with the rotation shaft 61. Thereby, the lifter 40 is also rotated by the engagement between the fitting hole 54 of the coupling member 50 and the fitting concave part 45 of the lifter 40.

The protrusions 42 of the lifter 40 are always biased to the guiding slopes 23 by the coil spring 73, and thus guided on the guiding slopes 23 by the rotation of the lifter 40. Thereby, the lifter 40 is moved in the axial direction.

The shaft member 32a is connected to the lifter 40 via the E-shaped ring 71 and the elastic resin member 72, and thus is moved in the axial direction by the axial movement of the lifter 40. Thereby, the pilot valve body 30 connected to the shaft member 32a is also moved in the axial direction.

When the end 13e of the outlet hole 13 on the side of the back pressure chamber 4 is opened by the movement of the pilot valve body 30 in the axial direction away from the main valve body 10 (in the upward direction in FIG. 2), the liquid in the back pressure chamber 4 starts to be discharged to the downstream side of the flow path 3 through the outlet hole 13. This condition is shown in FIG. 3. Then, the pressure in the back pressure chamber 4 is reduced, so that the main valve body 10 is opened.

When the liquid in the back pressure chamber 4 starts to be discharged through the outlet hole 13, new liquid starts to be supplied into the back pressure chamber 4 through the two inlet holes 12 provided in the main valve body 10. As a result, the main valve body 10 is moved and the position of the main valve body 10 is held in such a manner that the amount of the liquid discharged through the outlet hole 13 and the amount of the liquid supplied through the inlet holes 12 are the same (equilibrated). This condition is shown in FIG. 4. At this time, the amount of the discharged liquid depends on a relative distance between the pilot valve body 30 and the main valve body 10.

The main valve body 10 is moved according to the above principle. That is to say, the position of the main valve body 10 depends on the position of the pilot valve body 30. Therefore, by controlling the position of the pilot valve body 30, the position of the main valve body 10 can be controlled, so that the flow rate of the liquid discharged from the flow-rate adjustable valve 1 can be controlled.

In addition, in the present embodiment, the lifter 40 is provided with the three protrusions 42 distributed in the rotational direction, and the three guiding slopes 23 guide the respective three protrusions 42 of the lifter 40 in the axial direction by the rotation of the lifter 40 so as to move the lifter 40 in the axial direction. According to this structure, it is possible to set a larger feed angle (an axially feed amount relative to a rotational angle), compared with a conventional screw type of lifter, which is rotated more than 360 degrees. Thereby, conversion of a rotational movement into an axial movement can be suitably achieved. That is to say, the pilot valve body 30 can be moved to a great extent by a slight rotation, which improves responsiveness.

[Effects (1) Brought by the Shaft Member 32a and the Distal-End Member 32b]

In the present embodiment, the cross sectional area of the shaft member 32a at the part passing through the water-tight seal 34 is smaller than the opened area of the end 13e of the outlet hole 13 on the side of the back pressure chamber 4. Thus, in view of influence acting on the pilot valve body 30, a degree of holding force by the shaft member 32a is smaller than a degree of negative-pressure change caused by an open-degree change of the outlet hole 13.

Figure 24:
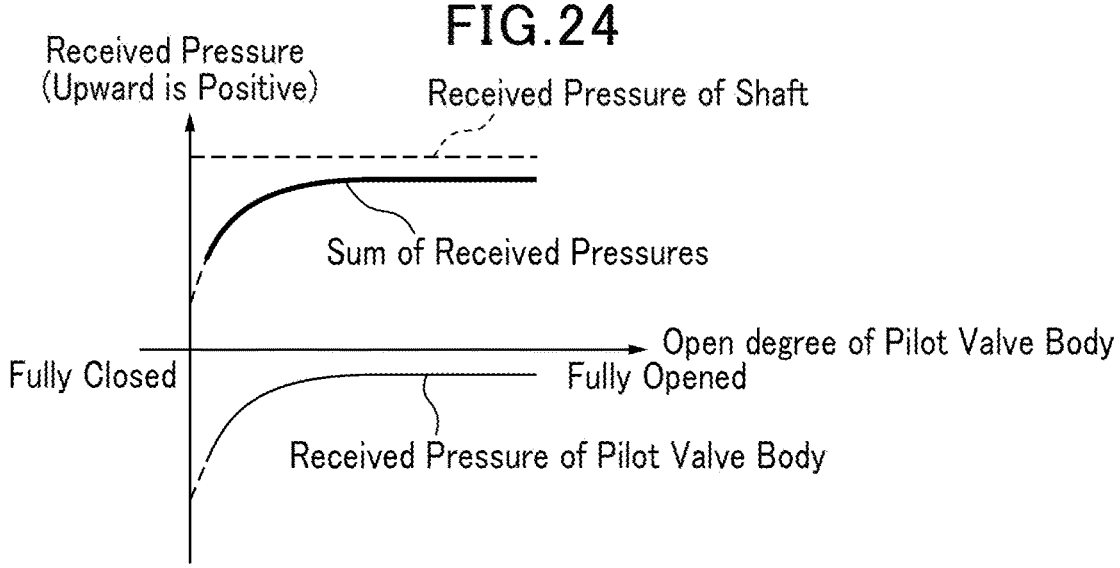
FIG. 24 is a graph showing a relationship between a holding force of a conventional elongated member and a negative pressure acting on an outlet hole.

The conventional pilot valve body is also held by the elongated member. However, the diameter of the conventional elongated member is about three times as much as that of the outlet hole. In this case, as shown in FIG. 24, the biasing force given to the elongated member in a valve-opening direction is great enough. (The biasing force corresponds to a difference between an atmospheric pressure received by the part of the shaft member passing through the water-tight seal and a liquid pressure acting on a surface of the elongated member in contact with the liquid. When the flow-rate adjustable valve is closed, the force acting on a part of the elongated member for closing the outlet hole is changed from a liquid pressure to an atmospheric pressure. However, even after this change, the biasing force is greater in the valve-opening direction. That is to say, it is necessary to provide a downward force for closing the pilot valve body.) Thus, even when the pilot valve body is subject to a negative pressure increasing just before the outlet hole has been closed, the holding force of the elongated member is great enough. That is to say, there is no concern about deflection or vibration of the pilot valve body, so that the pilot valve body is stably controlled.

Figure 25:
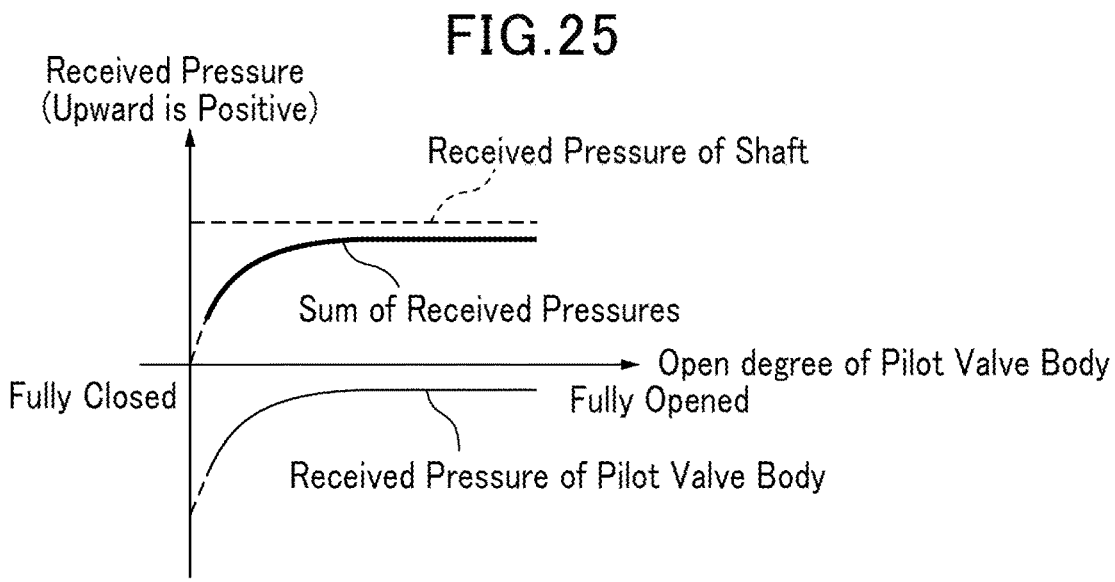
FIG. 25 is a graph showing a relationship between a holding force of the shaft member and a negative pressure acting on the outlet hole, when the diameter of the shaft member and the diameter of the outlet hole are substantially the same.

As shown in FIG. 25, when the diameter of the shaft member 32a and the diameter of the outlet hole 13 are substantially the same, the holding force of the shaft member 32a is great enough while the outlet hole 13 is opened. However, when the pilot valve body 30 is subject to a negative pressure increasing just before the outlet hole 13 has been closed, the holding force of the shaft member 32a and the negative pressure are canceled, so that deflection and/or vibration of the pilot valve body 30 is caused. That is to say, the control of the pilot valve body 30 is made unstable. This is because when the sum of the applied forces is nearly zero, the sum is often switched between positive and negative values, which makes the control unstable. (When the flow-rate adjustable valve 1 is closed, the force acting on the part of the elongated member 32 for closing the outlet hole 13 is changed from a liquid pressure to an atmospheric pressure. Thus, after this change, the biasing force in the valve-opening direction disappears.)

Figure 26:
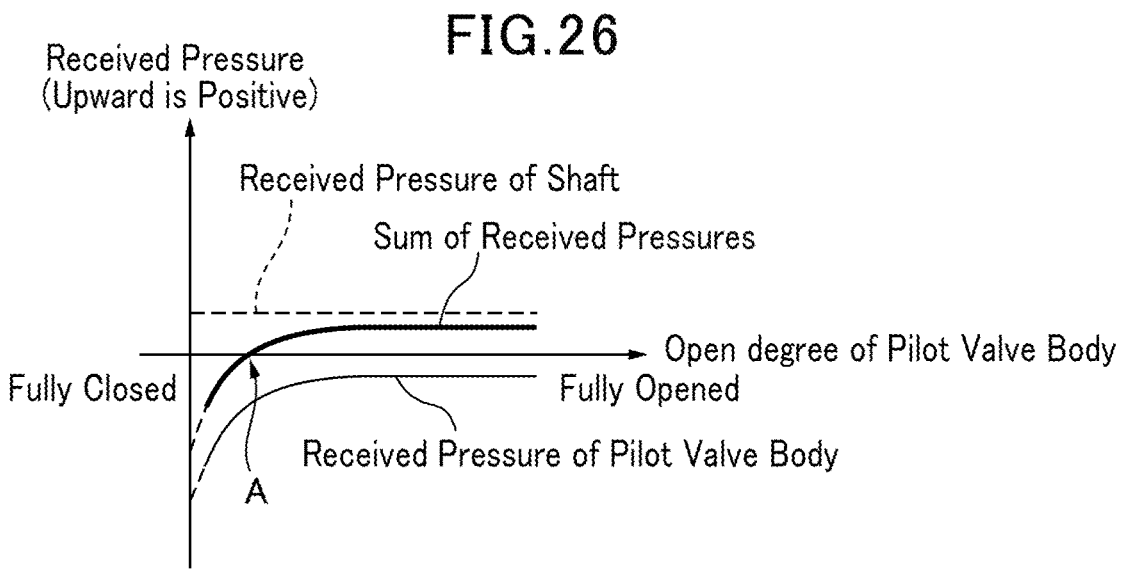
FIG. 26 is a graph showing a relationship between a holding force of the shaft member and a negative pressure acting on the outlet hole, when the diameter of the shaft member is smaller than the diameter of the outlet hole.

Contrary to the above, in the present embodiment, the diameter of the shaft member 32a holding the pilot valve body 30 is smaller than the diameter of the outlet hole 13. In this case, as shown in FIG. 26, the holding force of the shaft member 32a is great enough while the outlet hole 13 is greatly opened, but the holding force of the shaft member 32a is canceled by a negative pressure when the open degree of the outlet hole 13 is reduced to a predetermined open degree. Then, at the predetermined open degree of the pilot valve body 30 (the point A in FIG. 26), deflection and/or vibration of the pilot valve body 30 may be caused. However, at this open degree (the point A in FIG. 26), the flow rate is not small. Thus, high precision control is not needed. That is to say, there is no practical problem. On the other hand, in a region of fine open degree, in which high precision control is desired, the negative pressure is greater than the holding force of the shaft member 32a, so that there is no concern about deflection or vibration of the pilot valve body, and the pilot valve body is stably controlled. (When the flow-rate adjustable valve 1 is closed, the force acting on the part of the elongated member 32 for closing the outlet hole 13 is changed from a liquid pressure to an atmospheric pressure. Thus, after this change as well, the biasing force is greater in the valve-closing direction. That is to say, it is not necessary to provide a downward force for closing the pilot valve body 30.).

In addition, according to the present embodiment, it is enough to move the shaft member 32a having the smaller diameter for moving the pilot valve body 30. That is to say, the required amount of energy is reduced. In addition, it is also possible to reduce resistance caused by the water-tight seal 34 when the shaft member 32a is moved. Furthermore, since the force acting on the pilot valve body 30 just before the pilot valve body 30 has been closed is in the valve-closing direction, the pilot valve body 30 can be surely closed without any additional biasing force.

In addition, in the present embodiment, the elongated member 32 is separated into the shaft member 32a including the part passing through the water-sight seal 34 and the distal-end member 32b holding the pilot valve body 30. Thus, it is sufficient to design only the cross-sectional area of the shaft member 32a to be smaller than the opened area of the end 13e of the outlet hole 13 on the side of the back pressure chamber 4. That is to say, it is possible to freely design the cross-sectional area of the distal-end member 32b. In other words, the length of the shaft member 32a having the smaller cross-sectional area can be made shorter by the length of the distal-end member 32b. Thereby, it is possible to inhibit generation of inflection and/or bentness of the shaft member 32a.

In addition, in the present embodiment, the distal-end member 32b is connected to the shaft member 32a in such a manner that the distal-end member 32b is slidably movable to the shaft member 32a within a predetermined range in the axial direction. In addition, the elastic member 32c is interposed between the shaft member 32a and the distal-end member 32b to bias the shaft member 32a and the distal-end member 32b in a direction away from each other. Thus, due to the cushioning action of the elastic member 32c, it is possible to avoid that the pilot valve body 30 is excessively pressed to the outlet hole 13. In addition, even when a slight inclination of the shaft member 32a is generated, the pilot valve body 30 can move to the desired position on the outlet hole 13 since the slight inclination can be absorbed by the elastic member 32c. Thus, the valve-closing operation can be made reliably.

Herein, as another structure for avoiding that the pilot valve body 30 is excessively pressed to the outlet hole 13, it is possible to provide another elastic member between the distal-end member 32b and the upper surface of the hollow part 21 (see FIGS. 2 to 4) to bias the distal-end member 32b and the upper surface of the hollow part 21 in a direction away from each other, under the same condition in which the distal-end member 32b is connected to the shaft member 32a in such a manner that the distal-end member 32b is slidably movable to the shaft member 32a within a predetermined range in the axial direction.

In addition, in the present embodiment, the flow path 32g for the liquid is formed on the radially outer surface of the distal-end member 32b. Thus, when the distal-end member 32b is moved, the existence of the liquid presents less obstacles to the movement.

In addition, in the present embodiment, the shaft member 32a passes through a part of the lifter 40, and is engaged with the lifter 40 via the E-shaped ring 71 as a retaining mechanism. Thus, even if the shaft member 32a is thin, the shaft member 32a can be surely fixed to the lifter 40. In addition, when the shaft member 32a is thin, contact areas between the shaft member 32a and the other members can be made smaller, which can reduce sliding resistance therebetween.

In addition, in the present embodiment, the pilot valve body 30 is adhesively attached to an end of the distal-end member 32b. Thus, it is possible to effectively inhibit that "slip (backlash)" is generated between the distal-end member 32b and the pilot valve body 30.

In addition, in the present embodiment, the elastic force of the elastic member 32c of the elongated member 32 is smaller than the elastic force of the elastic resin member 72 as a biasing-connecting member. Thus, it is possible to effectively inhibit that breakage of the elongated member 32 is generated.

[Effects (2) Brought by the Elastic Resin Member 72]

In the present embodiment, the shaft member 32a is connected to the lifter 40 under a condition in which the shaft member 32a is biased to the lifter 40 in the axial direction toward the back pressure chamber 4 by the elastic resin member 72 as a biasing-connecting member. Thus, generation of a backlash, which may be caused by the way how to connect the shaft member 32a and the lifter 40, can be inhibited more surely. This is more effective for inhibiting that hysteresis is generated in controlling the flow rate, in combination with another effect that generation of another backlash, which may be caused between the rotation shaft 61 and the lifter 40, can be inhibited by the coil spring 73.

In addition, when the pilot valve body 30 is positioned, generation of deviation is remarkably inhibited. Thus, even if the water-stop area is made as small as possible, the water can be stopped more surely. Thereby, both the reliable water stop and the rapid responsiveness can be achieved at the same time.

In addition, deflection and/or vibration of the pilot valve body 30 is prevented.

In addition, in the present embodiment, the direction in which the shaft member 32a is biased to the lifter 40 by the elastic resin member 72 and the direction in which the lifter 40 is biased to the rotational shaft 61 by the coil spring 73 are the valve-closing direction for closing the pilot valve body 30. Thus, the pilot valve body 30 can be maintained stably in its closed state, even when the stepping motor 60 breaks down.

In addition, in the present embodiment, the elastic resin member 72 is rotated integrally with the lifter 40. Thus, no great torsion torque is generated between the lifter 40 and the elastic resin member 72, and generation of sliding resistance therebetween is also inhibited. Thereby, the torque applied to the stepping motor 60 can be reduced, and thus the stepping motor 60 can be made compact.

[Effects (3) Brought by the Symmetric Inlet Holes 12]

According to the present embodiment, based on the above configurations and arrangements of the main valve body 10 and the two inlet holes 12, the absolute value of the sum of the moments acting on the main valve body 10 based on the liquid flowing into the back pressure chamber 4 through the two inlet holes 12 is adjusted to substantially 0 Nm under the condition in which the pilot valve body 30 opens the outlet hole 13.

If the configurations and arrangements of the main valve body 10 and the two inlet holes 12 are adjusted to satisfy the above conditions, inclination of the main valve body 10 during the movement thereof is surely inhibited.

The moments (or the forces based on the moments) acting on the main valve body 10 based on the liquid flowing into the back pressure chamber 4 through the two inlet holes 12 may be actually measured, but also can be evaluated by analyzing measures using a computer, such as a CAE (Computer Aided Engineering) or a CFD (Computational Fluid Dynamics), which have been widely used in designing any flow-rate adjustable valve. Specifically, a 3D model of the main valve body 10 may be prepared based on dimensional data of the main valve body 10, and the flow of the liquid (water) may be analyzed by the analyzing measures (using a computer), so that orientations and values of the moments (or the forces) acting on the main valve body 10 may be determined. As an example, it is possible to use software "SCRYU/Tetra", which is available from Software Cradle Co., Ltd.

The number of the inlet holes 12 is not limited to two. Three or more inlet holes 12 may be provided as long as the absolute value of the sum of the moments acting on the main valve body 10 based on the liquid flowing into the back pressure chamber 4 through the inlet holes 12 is adjusted to 0.001 Nm or less.

In addition, in the present embodiment, the two inlet holes 12 are provided in the main valve body 10. Thus, it is possible to design the number of the inlet holes 12, the positions of the respective inlet holes 12, the size and shape of each inlet hole 12, and the like, at the same time when the main valve body 10 is designed.

In addition, in the present embodiment, each of the two inlet holes 12 is provided as a straight channel in the main valve body 10. Thereby, since the pressure loss caused by each inlet hole 12 is small, the inflow of the liquid and/or the discharge of the air can be carried out more efficiently.

In addition, the main valve body 10 of the present embodiment has the substantially symmetric shape around the axis X of the main valve body 10, and the center of gravity of the main valve body 10 is located on the axis X. Thereby, since the balance of the main valve body 10 itself with respect to the force of gravity is good, it is easy to design the flow-rate adjustable valve 1 so as to inhibit the inclination of the main valve body 10 during the movement thereof.

In addition, in the present embodiment, the two inlet holes 12 are arranged as one pair, and are located at the positions symmetric with respect to the axis X of the main valve body 10. Thus, since the moments acting on the main valve body 10 based on the liquid flowing into the back pressure chamber 4 through the inlet holes 12 as the one pair are canceled by each other, the inclination of the main valve body 10 during the movement thereof can be inhibited more effectively.

Herein, if the cross sectional shapes of the inlet holes 12 are not isotropic, it is preferable that the inlet holes 12 of each pair have cross sectional shapes mirror symmetric with respect to the axis X of the main valve body 10.

In addition, in the present embodiment, when the main valve body 10 is arranged in such a manner that the direction in which the main valve body 10 is opened and closed is horizontal, one inlet hole 12 is arranged in the upper area with respect to the axis X of the main valve body 10, and another one inlet hole 12 is arranged in the lower area with respect to the axis X of the main valve body 10. In this case, the liquid can flow into the back pressure chamber 4 in a well-balanced manner from both the inlet hole 12 arranged in the upper area and the inlet hole 12 arranged in the lower area, under a condition in which there is no liquid in the back pressure chamber 4 (for example, when a washing facility including the flow-rate adjustable valve is installed). Thus, the air in the back pressure chamber 4 is smoothly discharged and replaced with the liquid, which prevents an air-entrainment phenomenon (so-called air-biting). In addition, oppositely, when a liquid drainage is carried out, the liquid may be smoothly discharged and replaced with the air.

[Effects (4) Brought by the Stopper 80]

It is effective to adjust the range restricted by the stopper 80 for each flow-rate adjustable valve 1, in order to achieve a desired range of the stroke of the pilot valve body 30 of each flow-rate adjustable valve 1 with consideration for accumulation of variation in each size and/or in assembly of parts of each flow-rate adjustable valve 1.

Specifically, for example, regarding a closed-valve position (at which the pilot valve body 30 is controlled farthest on the closing side), if a clearance (margin) is too small, water-stop performance might be not good. On the other hand, if a clearance (margin) is too large, opening-response performance might be not good. Thus, for each flow-rate adjustable valve 1, it is preferable to adjust the stroke of the pilot valve body 30, in order to achieve a suitable closed-valve position.

Thus, in the flow-rate adjustable valve 1 of the present embodiment, the stopper 80 is selectively held either in the fixed state in which the position of the stopper 80 is not able to be changed or in the provisional fixed state in which the position of the stopper 80 is able to be changed.

As shown in FIGS. 16 to 18, the stopper 80 of the present embodiment has the pillar-like shape which has the substantially C-shaped section in order to restrict the rotatable range of the stopper-restricting part 58 of the coupling member 50. Thereby, the cost of the stopper 80 itself is small, the space occupied by the stopper 80 is also small, and it is easy to contain the stopper 80 in the small space.

In addition, as shown by the arrow in FIG. 18, the stopper 80 is switched to the fixed state when the both ends of the stopper 80 are compressed in the axial direction and the substantially C-shaped section of the stopper 80 is enlarged. According to this feature, the structure for switching the stopper 80 between the provisional fixed state and the fixed state can be achieved at low costs. In addition, the resilient force of the compressed and enlarged stopper 80 acts to return the stopper 80 to its original shape, i.e., the resilient force acts to contract the substantially C-shaped section of the stopper 80 as well as extend the axial length of the stopper 80. Therefore, the compressing force is increased by the resilient force, which makes the fixed state more stable.

Specifically, in the present embodiment, as shown in FIGS. 1 to 4, the stopper 80 is compressed by the casing member 91 arranged on the outer-periphery side of the lifter 40 and the cover member 92 fixed to the housing 62 of the stepping motor 60, so that the stopper 80 is held in the fixed state. On the other hand, when a gap is generated between the casing member 91 and the cover member 92, the stopper 80 can rotate around an axis of the stopper 80, i.e., the stopper 80 is held in the provisional fixed state.

The cover member 92 serves as both the structure for switching the stopper 80 between the provisional fixed state and the fixed state and the structure for fixing the stepping motor 60. Thus, the increase of the number of parts is inhibited.

In the present embodiment, the casing member 91 and the cover member 92 are fastened by just one screw member 93 to compress the stopper 80. However, two or more screw members 93 may be used. Alternatively, any fastening member other than the screw member may be used.

In the present embodiment, as shown in FIGS. 2 to 4, the rotational axis of the screw member 93 is offset from the axis of the stopper 80. Thus, when the screw member 93 is operated, it is prevented that the stopper 80 is undesirably rotated and the position of the stopper 80 is undesirably changed.

In addition, as seen from FIG. 18, the lower end of the stopper 80 in the axial direction is provided with inclination 82 in which the length in the axial direction of the stopper 80 is greater at the outer portion. In other words, the inclination 82 is a part of a concave conical surface. According to this feature, when the stopper 80 is compressed, the substantially C-shaped section of the stopper 80 is enlarged in a well-balanced (even) manner around the axis of the stopper 80. In addition, generation of decentering of the stopper 80 is inhibited, and thus the stopper 80 is stable in the compressed and enlarged state thereof. This means that the fixed state of the stopper 80, in which the position of the stopper 80 is not able to be changed, is stable. In addition to or alternatively to the lower end of the stopper 80, the same inclination may be provided on the upper end of the stopper 80.

In the present embodiment, furthermore, the upper surface of the casing member 91 configured to compress the lower end of the stopper 80 in the axial direction is provided with inclination 91t in which the length in the axial direction of the casing member 91 is smaller at the outer portion. In other words, the inclination 91t is a part of a convex conical surface. According to this feature as well, when the stopper 80 is compressed, the substantially C-shaped section of the stopper 80 is enlarged in a well-balanced (even) manner around the axis of the stopper 80. In addition to or alternatively to the upper end of the casing member 91, the same inclination may be provided on the lower end of the casing member 91.

In the present embodiment, a part of the stopper 80 is exposed outside (visible from outside) through the window 92w of the cover member 92. In addition, as shown in FIGS. 16 and 17, the stopper 80 is provided with stripe patterns, which function as a scale. Furthermore, the stopper 80 is provided with a knob 81 for an adjustment operation. On the other hand, the window 92w is provided with an indication 92i. It is possible to adjust the position of the stopper 80 for each flow-rate adjustable valve 1 by adjusting the relative positional relationship between the stripe patterns and/or the knob 81 provided on the stopper 80 and the indication 92i provided at the window 92w.

Specifically, at first, the stopper 80 is held in the provisional fixed state by the casing member 91 and the cover member 92 as a stopper-holding member. In detail, a gap is generated and maintained between the casing member 91 and the cover member 92 (the cover member 92 is lifted above the casing member 91). In this provisional fixed state, the flow-rate adjustable valve 1 is connected to a flow path, and the stepping motor 60 is driven, so that one or more water-passing and water-stop trials are carried out. While carrying out the water-passing and water-stop trials, the knob 81 is rotated in both directions in order to seek for a position of the stopper 80 that can obtain a desired water-stop control. Then, at the sought-for position of the stopper 80, the casing member 91 and the cover member 92 are fastened to each other, so that the stopper 80 is compressed and enlarged. Thus, the stopper 80 is switched to the fixed state in which the position of the stopper 80 is not able to be changed.

Figure 27:
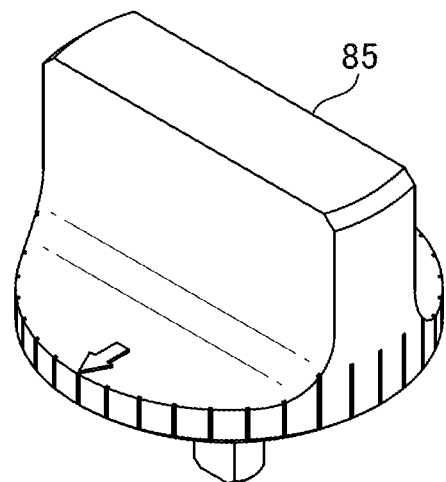
FIG. 27 is a perspective view of a manual adjustment jig, as seen diagonally from upside.
Figure 28:
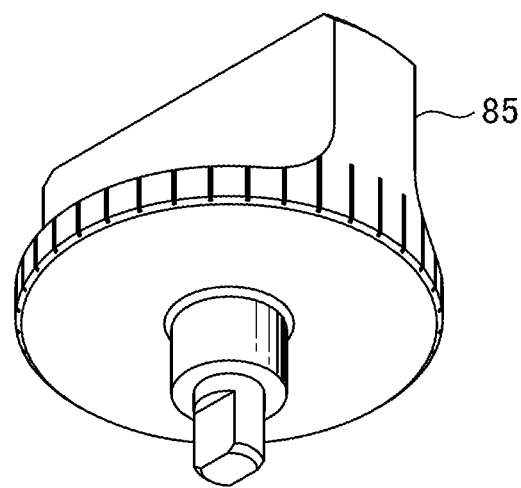
FIG. 28 is a perspective view of the manual adjustment jig, as seen diagonally from downside.
Figure 29:
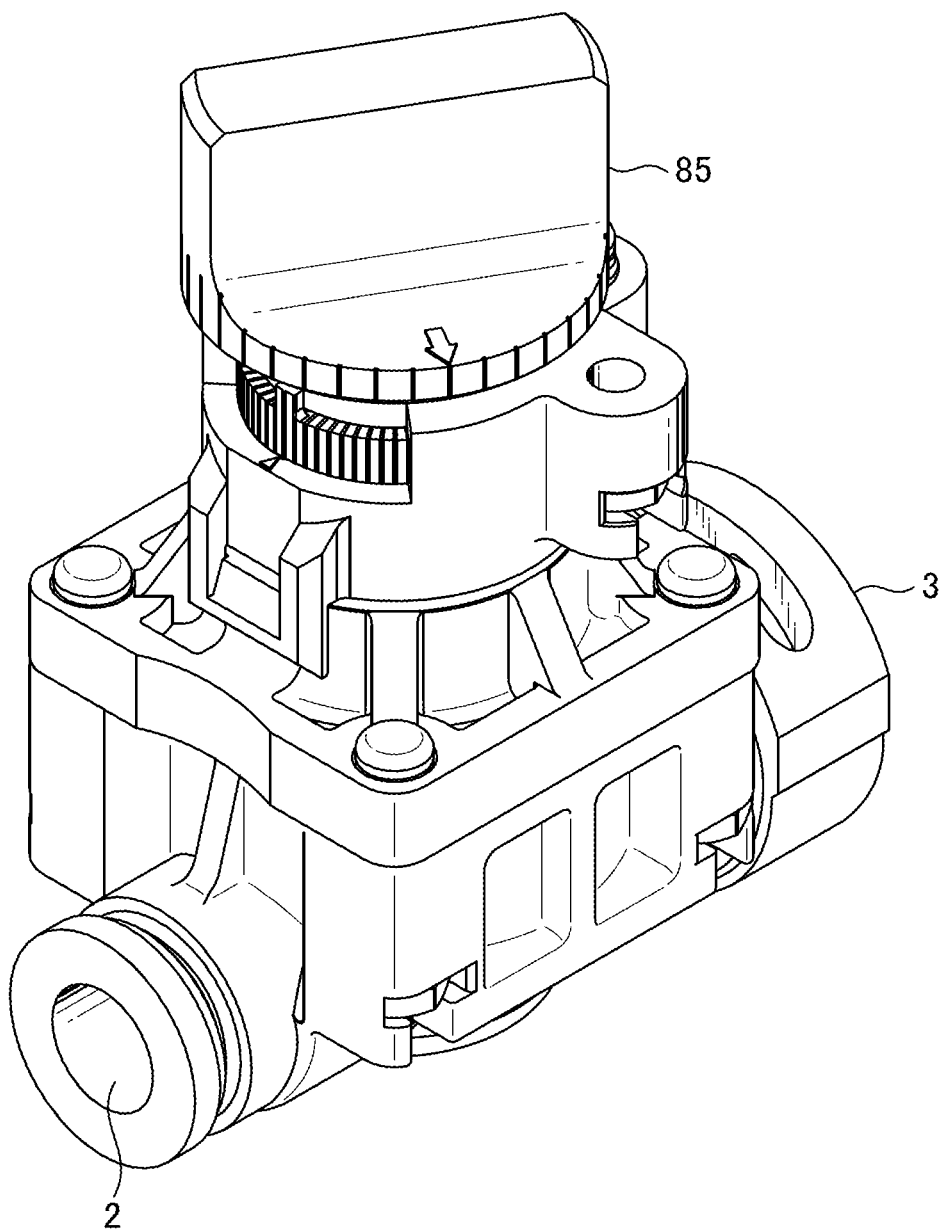
FIG. 29 is a perspective view of the flow-rate adjustable valve when the positions of the coupling member and the stopper are adjusted by using the manual adjustment jig.

During the one or more water-passing and water-stop trials, a manual adjustment jig 85 may be used, instead of the stepping motor 60. FIG. 27 is a perspective view of the manual adjustment jig 85 as seen diagonally from upside, and FIG. 28 is a perspective view of the manual adjustment jig 85 as seen diagonally from downside. FIG. 29 is a perspective view of the flow-rate adjustable valve 1 when the positions of the coupling member 50 and the stopper 80 are adjusted by using the manual adjustment jig 85.

When the manual adjustment jig 85 is used, the stopper 80 is held in the provisional fixed state by the casing member 91 and the cover member 92 as a stopper-holding member, in the same way as the above. In detail, a gap is generated and maintained between the casing member 91 and the cover member 92 (the cover member 92 is lifted above the casing member 91). On the other hand, the stepping motor 60 (including the rotation shaft 61 and the housing 62) is removed from the cover member 92. Then, the flow-rate adjustable valve 1 without the stepping motor 60 is connected to a flow path.

Furthermore, the manual adjustment jig 85 is connected to a rotational-shaft-receiving part 56 of the coupling member 50, instead of the stepping motor 60. Thereafter, one or more water-passing and water-stop trials are carried out while manually rotating the coupling member 50 and the stopper 80 by using the manual adjustment jig 85. In detail, while carrying out the water-passing and water-stop trials, the manual adjustment jig 85 is rotated in both directions in order to seek for a position of the coupling member 50 and the stopper 80 that can obtain a desired water-stop control. Then, at the sought-for position of the stopper 80, the casing member 91 and the cover member 92 are fastened to each other, so that the stopper 80 is compressed and enlarged. Thus, the stopper 80 is switched to the fixed state in which the position of the stopper 80 is not able to be changed.

As described above, according to the present embodiment, it is possible to easily adjust the position of the stopper 80 for each flow-rate adjustable valve 1. Thus, the stroke of the pilot valve body 30 for each flow-rate adjustable valve 1 can be easily adjusted so as to achieve a suitable closed-valve position, regardless of variation among respective flow-rate adjustable valves.

[Effects (5) Brought by the Drive Unit 101]

Figure 30:
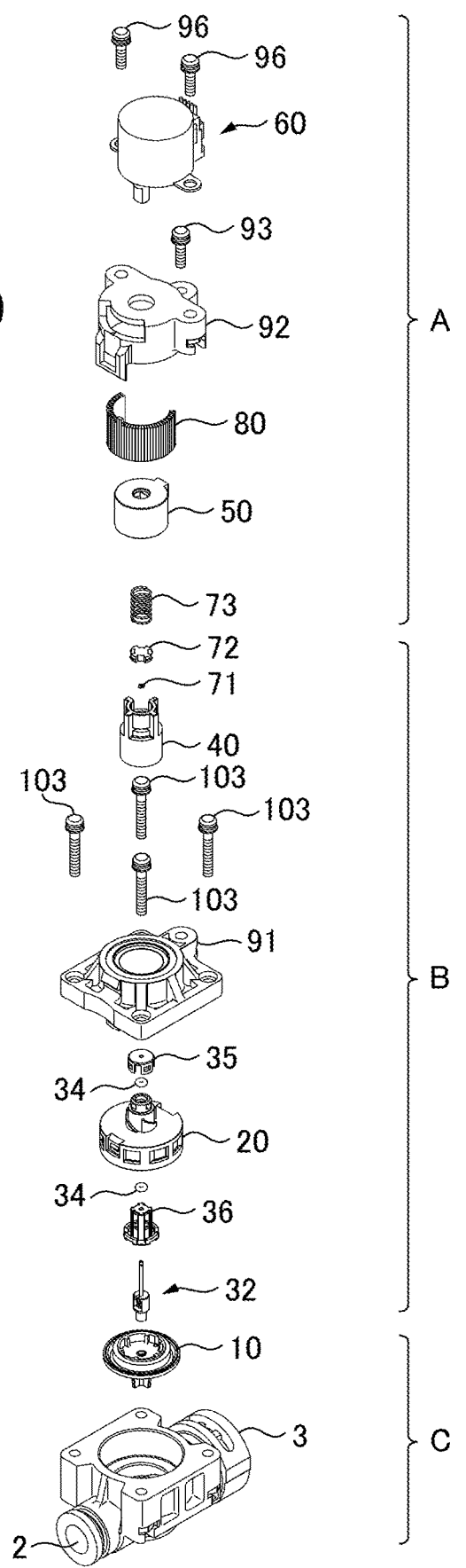
FIG. 30 is an exploded perspective view of the flow-rate adjustable valve of FIG. 1.
Figure 31:
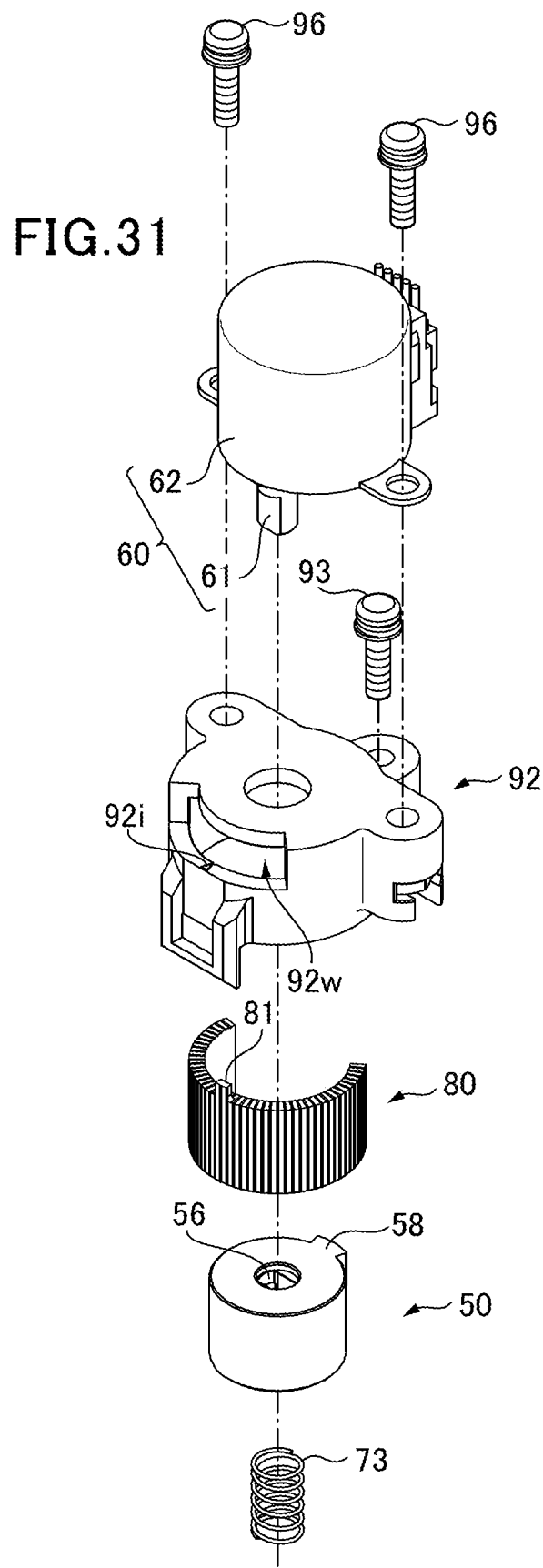
FIG. 31 is an enlarged view of the area A of FIG. 30 (an upper part of a drive unit)
Figure 32:
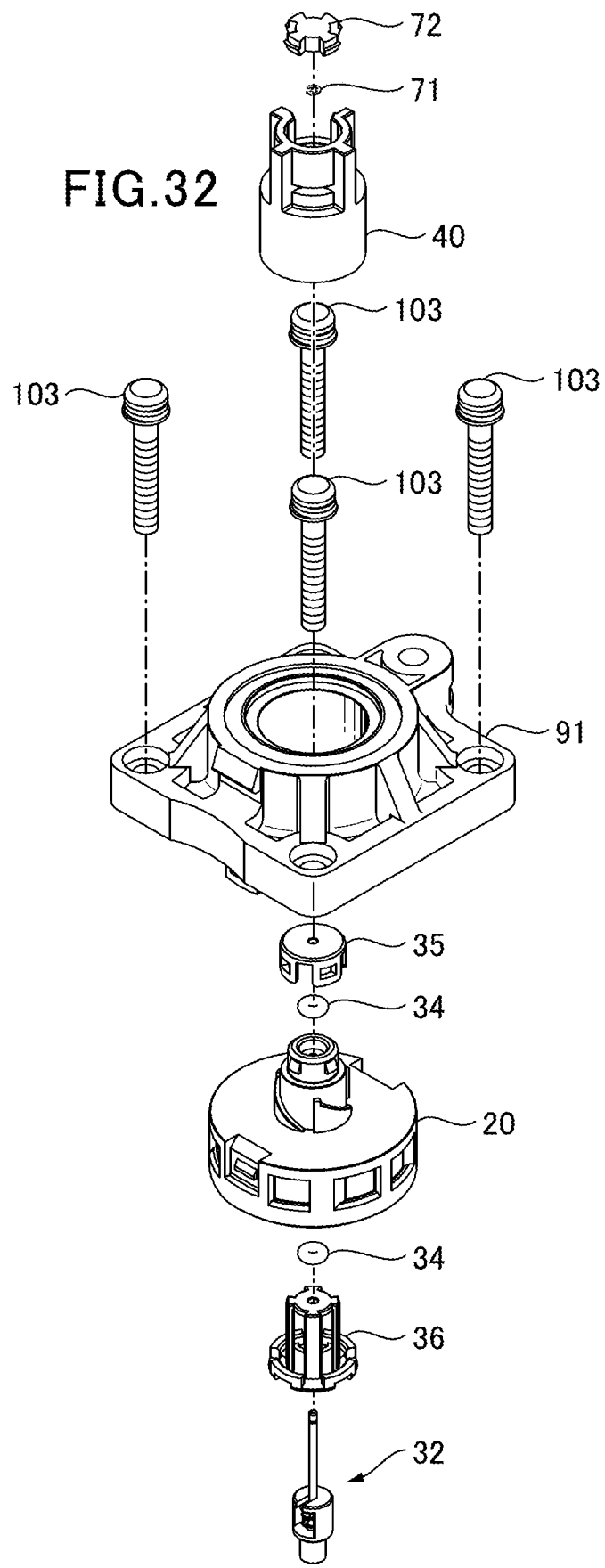
FIG. 32 is an enlarged view of the area B of FIG. 30 (a lower part of the drive unit)
Figure 33:
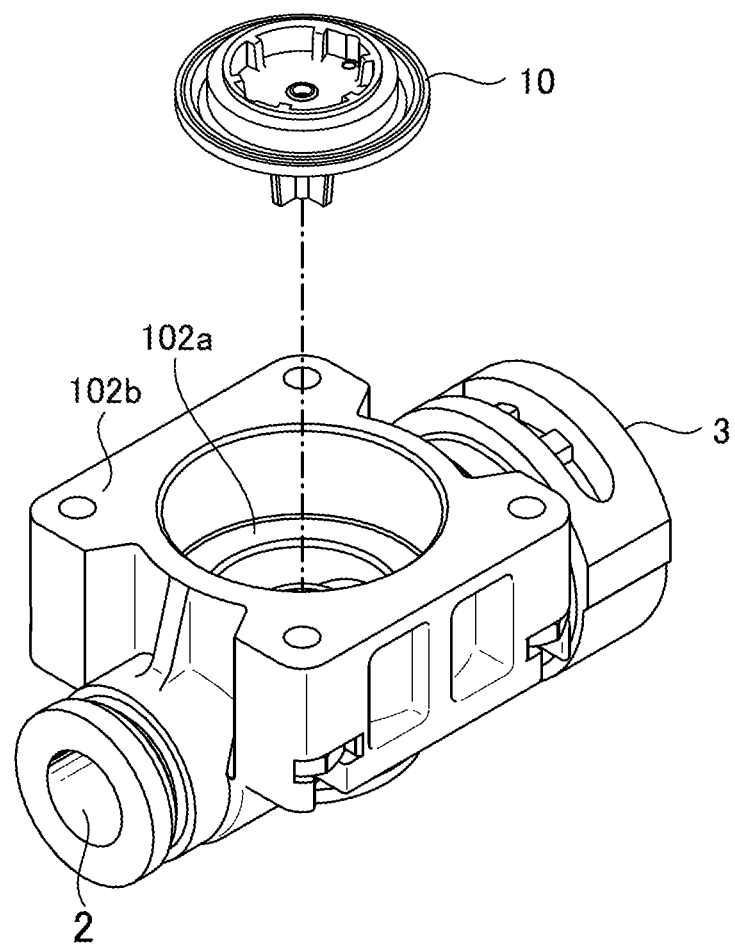
FIG. 33 is an enlarged view of the area C of FIG. 30 (based unit)

FIG. 30 shows an exploded perspective view of the flow-rate adjustable valve 1 of the present embodiment. FIGS. 31 to 33 are enlarged views of the areas A, B and C of FIG. 30, respectively.

In the flow-rate adjustable valve 1 of the present embodiment, members shown in FIGS. 31 and 32 are united to form a drive unit 101. The drive unit 101 is integrally removable from a base unit 102 including the flow path 2, 3 and the main valve body 10.

According to this structure, for a common maintenance operation, it is enough to remove the drive unit 101 from the base unit 102. That is to say, it is not necessary to break down the inside members of the drive unit 101. Thus, accumulation of variation regarding the inside members of the drive unit 101 is not changed even after the maintenance operation. Thus, it is possible to maintain high performance in adjusting the flow rate without adjusting again the range restricted by the stopper 80.

In addition, according to this structure, when the drive unit 101 is removed from the base unit 102, the main valve body 10 and the pilot valve body 30 are exposed. Thus, it is possible to easily and rapidly carry out a maintenance operation for these valve bodies 10, 30. In particular, the main valve body 10 is often subject to the maintenance operation. Thus, if the main valve body 10 is separated from the drive unit 101, the maintenance operation is easy.

Figure 34:
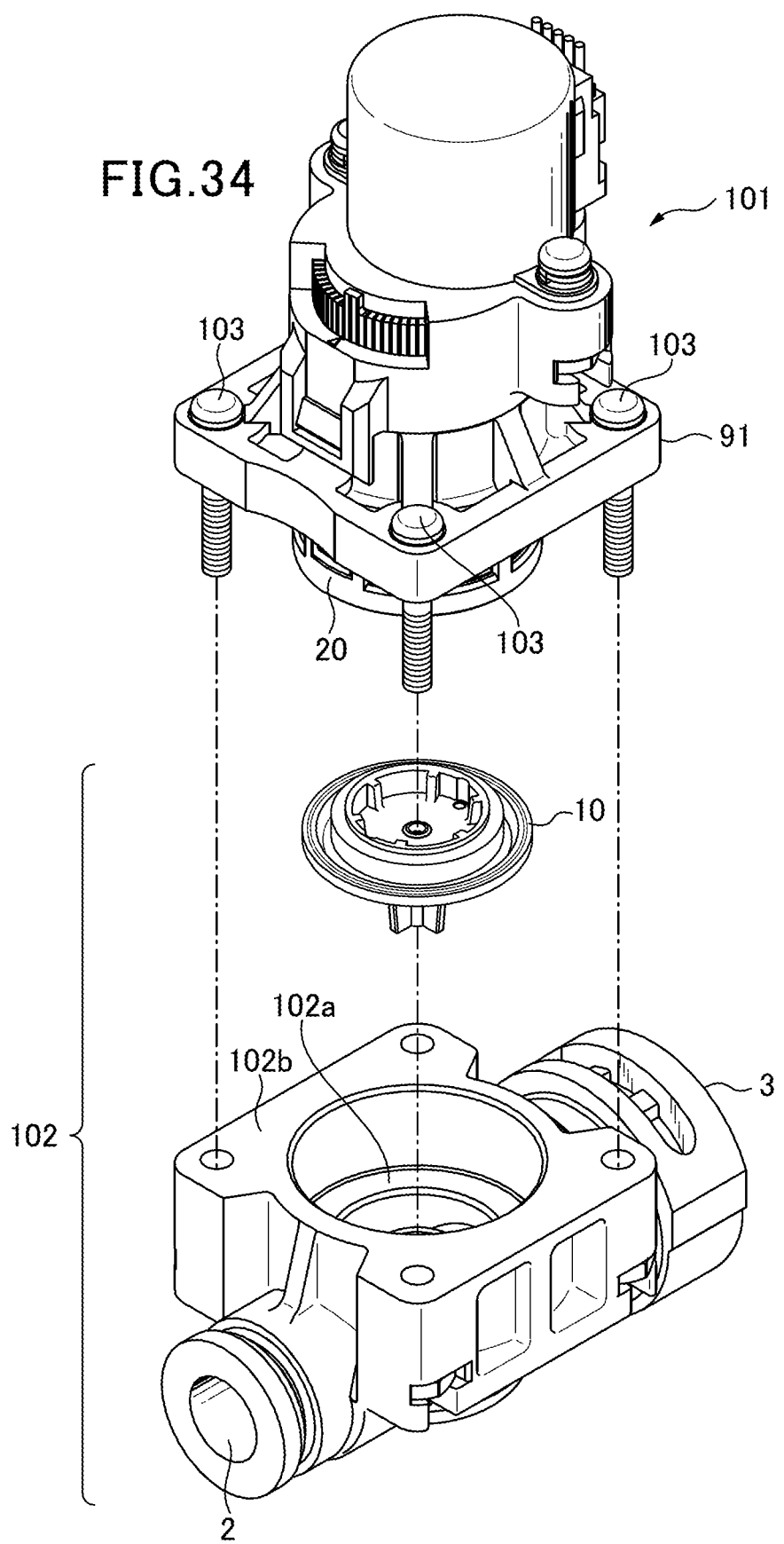
FIG. 34 is an exploded perspective view of the drive unit, the base unit and the main valve body, as seen diagonally from upside.
Figure 35:
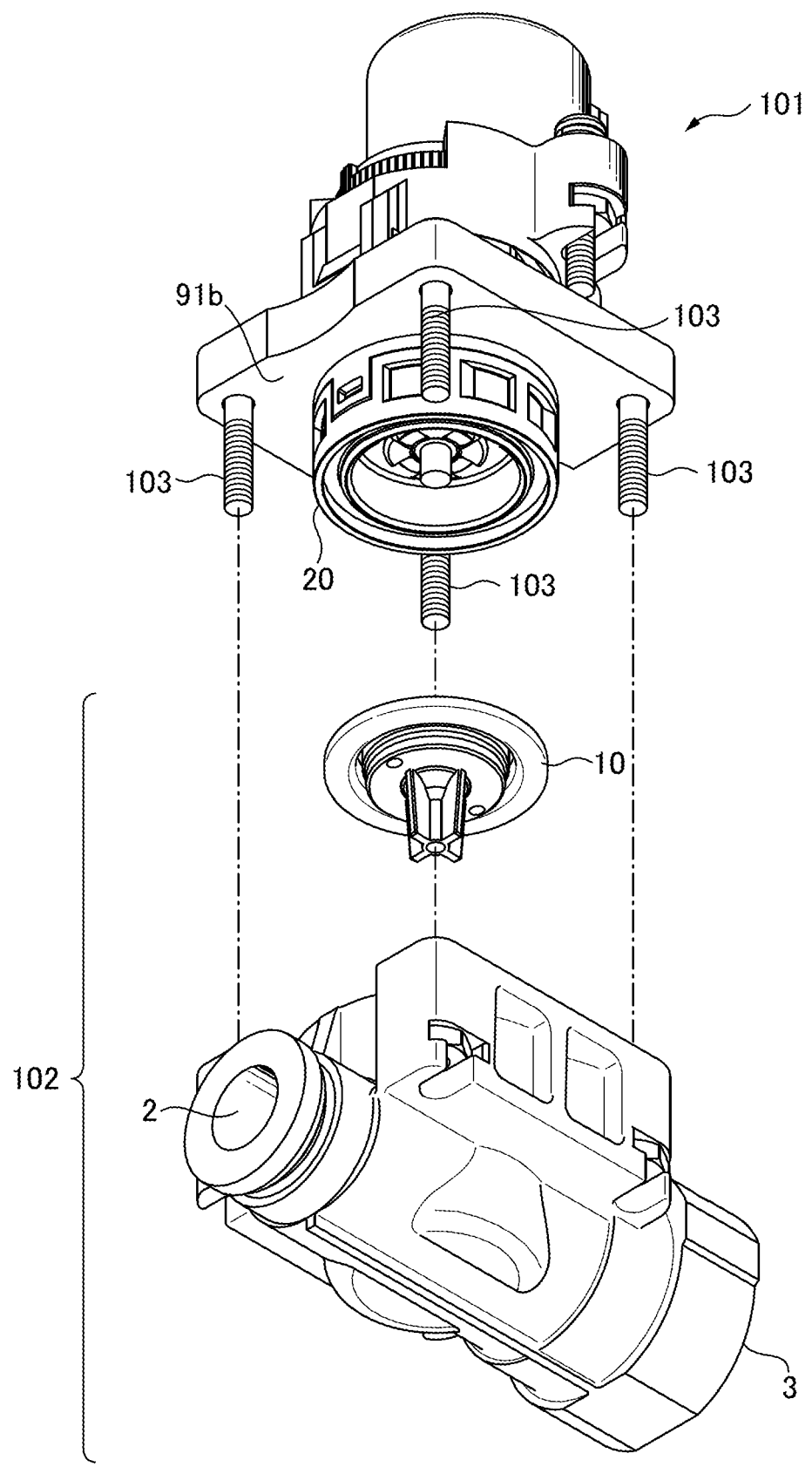
FIG. 35 is an exploded perspective view of the drive unit, the base unit and the main valve body, as seen diagonally from downside.

In order to promote understanding of the above, FIGS. 34 and 35 show exploded perspective views in which the drive unit 101 is removed from the base unit 102 and the main valve body 10 of the base unit 102 is removed. FIG. 34 is an exploded perspective view as seen diagonally from upside, and FIG. 35 is an exploded perspective view as seen diagonally from downside.

In addition, in the present embodiment, a fastening member for fastening the inside members of the drive unit 101 and an assembling member for assembling the drive unit 101 and the base unit 102 are different types of members from each other. Specifically, the one screw member 93 (fastening member) for fastening the casing member 91 and the cover member 92 to each other and two screw members 96 (fastening member) for fixing the housing 62 of the stepping motor 60 to the cover member 92 are special screw members, respectively. The special screw member means a screw member having a strange-shaped head, which requires a special tool. For example, the special screw member has a star-shaped head. On the other hand, the assembling member 103 for assembling the drive unit 101 and the base unit 102 consists of four normal screw members. Thus, when the assembling member 103 is operated, it is effectively prevented that the screw members 93, 96 are operated in error.

In addition, in the present embodiment, as seen from FIG. 32, the assembling member 103, i.e., the four normal screw members extend in the same direction. Thus, it is easy to operate the four normal screw members. For example, the drive unit 101 is easily fixed to or removed from the base unit 102 without rotating the flow-rate adjustable valve 1 nor changing the posture thereof.

In addition, in the present embodiment, a sealing part 11s continuous from the diaphragm membrane 11 of the main valve body 10 (see FIG. 2) is interposed between the lower end of the back-pressure-chamber forming member 20, which is the lowermost end of the drive unit 101, and a corresponding receiving part 102a of the base unit 102 (see FIG. 34). The diaphragm membrane 11 functions as a water-tight member to prevent leakage of the liquid from the back pressure chamber 4. On the other hand, a lower surface 91b of the casing member 91 of the drive unit 101 (see FIG. 35) and a corresponding upper surface 102b of the base unit 102 (see FIG. 34) are adapted to come in direct contact with each other.

Thus, even though torque management of the four screw members 103 as an assembling member is not carried out, it is possible to always provide a predetermined "sealing margin" at the sealing part 11s. In addition, there is no concern about inclination of the drive unit 101 even when the four screw members 103 are assembled with different forces (different assembling degrees).

Furthermore, in the present embodiment, the one screw member 93 fastening the casing member 91 and the cover member 92 to each other is arranged at the position which is difficult of access, after the drive unit 101 has been assembled. This is effective for preventing that the adjusted position of the stopper 80 is changed in error.

Intermediate Concept (1) Obtained from the Present Embodiment (Elongated Member 32)

The flow-rate adjustable valve 1 derivable from the present embodiment includes: the main valve body 10 movably supported in the flow path 2, 3 via an elastic member (for example, the diaphragm membrane 11); the back pressure chamber 4 in which liquid (for example, cold water and/or hot water) supplied from the upstream side of the flow path 2 at a predetermined pressure is contained and a biasing force is generated in a valve-closing direction for closing the main valve body 10 by the supplied liquid; the inlet hole 12 communicating the upstream side of the flow path 2 with the back pressure chamber 4; the outlet hole 13 communicating a downstream side of the flow path 3 with the back pressure chamber 4; the pilot valve body 30 for opening and closing the outlet hole 13; the elongated member 32 holding the pilot valve body 30 and capable of causing the pilot valve body 30 to move in an axial direction of the elongated member 32; a rotatable member (for example, the rotational shaft 61 of a motor); and the lifter 40 rotatable by a rotation of the rotatable member and also movable in the axial direction of the elongated member 32 by the rotation of the rotatable member. The lifter 40 and the elongated member 32 are connected in such a manner that the lifter 40 and the elongated member 32 are integrally movable in the axial direction of the elongated member 32. The elongated member 32 extends continuously both through a region on the side of the back pressure chamber 4, in which the liquid can exist, and through an atmospheric region, in which the liquid cannot exits, via the water-tight seal 34. In addition, the cross sectional area of the elongated member 32 at the part passing through the water-tight seal 34 is smaller than the opened area of the end 13e of the outlet hole 13 on the side of the back pressure chamber 4.

According to the above feature, since the flow-rate adjustable valve 1 adopts the structure using the back pressure chamber 4 and the pilot valve body 30, it is possible to operate the main valve body 10 with a smaller force.

In addition, since the cross-sectional area of the elongated member 32 at the part passing through the water-tight seal 34 is smaller than the opened area of the end 13e of the outlet hole 13 on the side of the back pressure chamber 4, in view of the influence acting on the pilot valve body 30, the degree of holding force by the elongated member 32 is smaller than the degree of negative-pressure change caused by the open-degree change of the outlet hole 13.

In this case, as explained with reference to FIG. 26, the holding force of the elongated member 32 is great enough while the outlet hole 13 is greatly opened, but the holding force of the elongated member 32 is canceled by a negative pressure when the open degree of the outlet hole 13 is reduced to a predetermined open degree. Then, at the predetermined open degree of the pilot valve body 30 (the point A in FIG. 26), deflection and/or vibration of the pilot valve body 30 may be caused. However, at this open degree (the point A in FIG. 26), the flow rate is not small. Thus, high precision control is not needed. That is to say, there is no practical problem. On the other hand, in a region of fine open degree, in which high precision control is desired to achieve a stable movement and holding of the main valve body 10, the negative pressure is greater than the holding force of the elongated member 32, so that there is no concern about deflection or vibration of the pilot valve body 30, and the pilot valve body 30 is stably controlled. (When the flow-rate adjustable valve 1 is closed, the force acting on the part of the elongated member 32 for closing the outlet hole 13 is changed from a liquid pressure to an atmospheric pressure. Thus, after this change as well, the biasing force is greater in the valve-closing direction. That is to say, it is not necessary to provide a downward force for closing the pilot valve body 30.).

In addition, it is enough to move the elongated member 32 having the smaller diameter for moving the pilot valve body 30. That is to say, the required amount of energy is reduced. In addition, it is also possible to reduce resistance caused by the water-tight seal 34 when the elongated member 32 is moved. Furthermore, since the force acting on the pilot valve body 30 just before the pilot valve body 30 has been closed is in the valve-closing direction, the pilot valve body 30 can be surely closed without any additional biasing force.

Herein, the cross sectional shape of the outlet hole 13 and the cross sectional shape of the elongated member 32 are not limited to the circles, respectively.

In addition, as described above, it is preferable that the elongated member 32 includes the shaft member 32a including the part passing through the water-sight seal 34 and the distal-end member 32b holding the pilot valve body 30. In this case, it is sufficient to design only the cross-sectional area of the shaft member 32a to be smaller than the opened area of the end 13e of the outlet hole 13 on the side of the back pressure chamber 4. That is to say, it is possible to freely design the cross-sectional area of the distal-end member 32b. In other words, the length of the shaft member 32a having the smaller cross-sectional area can be made shorter by the length of the distal-end member 32b. Thereby, it is possible to inhibit generation of inflection and/or bentness of the shaft member 32a.

In addition, as described above, it is preferable that the distal-end member 32b is connected to the shaft member 32a in such a manner that the distal-end member 32b is slidably movable to the shaft member 32a within a predetermined range in the axial direction, and that the elastic member 32c is provided to bias the distal-end member 32b in the valve-closing direction. In this case, due to the cushioning action of the elastic member 32c, it is possible to avoid that the pilot valve body 30 is excessively pressed to the outlet hole 13. In addition, in this case, even when a slight inclination of the shaft member 32a is generated, the pilot valve body 30 can move to the desired position on the outlet hole 13 since the slight inclination can be absorbed by the elastic member 32c. Thus, the valve-closing operation can be made reliably.

In addition, as described above, it is preferable that the flow path 32g for the liquid is formed on at least a part of the radially outer surface of the distal-end member 32b. In this case, when the distal-end member 32b is moved, the existence of the liquid can present less obstacles to the movement.

In addition, as described above, it is preferable that the elongated member 32 passes through a part of the lifter 40, and is engaged with the lifter 40 via a retaining mechanism. In this case, it is possible to surely prevent that the elongated member 32 is removed from the lifter 40. Furthermore, it is preferable that the retaining mechanism has the E-shaped ring 71. In this case, even if the elongated member 32 is thin, the elongated member 32 can be surely fixed to the lifter 40. When the elongated member 32 is thin, contact areas between the elongated member 32 and the other members can be made smaller, which can reduce sliding resistance therebetween.

In addition, as described above, the elongated member 32 is connected to the lifter 40 under a condition in which the elongated member 32 is biased to the lifter 40 in a one-way direction of the axial direction by a biasing-connecting member. In this case, since the elongated member 32 is biased to the lifter 40 in the one-way direction of the axial direction, deflection and/or vibration of the pilot valve body 30 is prevented. This is effective in particular at or around a predetermined open degree (the point A in FIG. 26) at which the sum of the forces acting on the pilot valve body 30 is nearly zero.

Herein, in the flow-rate adjustable valve 1 according to the intermediate concept (1), the rotatable member is not limited to the rotational shaft 61 of the stepping motor 60, but may be any rotatable member that may be manually rotated. That is to say, the flow-rate adjustable valve 1 may be a manual type of flow-rate adjustable valve.

Intermediate Concept (2) Obtained from the Present Embodiment (Elastic Resin Member 72)

The flow-rate adjustable valve 1 derivable from the present embodiment includes: the main valve body 10 movably supported in the flow path 2, 3 via an elastic member (for example, the diaphragm membrane 11); the back pressure chamber 4 in which liquid (for example, cold water and/or hot water) supplied from the upstream side of the flow path 2 at a predetermined pressure is contained and a biasing force is generated in a valve-closing direction for closing the main valve body 10 by the supplied liquid; the inlet hole 12 communicating the upstream side of the flow path 2 with the back pressure chamber 4; the outlet hole 13 communicating a downstream side of the flow path 3 with the back pressure chamber 4; the pilot valve body 30 for opening and closing the end 13e of the outlet hole 13 on a side of the back pressure chamber 4; the elongated member 32 holding the pilot valve body 30 and capable of moving the pilot valve body 30 in an axial direction of the elongated member 32; a rotatable member (for example, the rotational shaft 61); and the lifter 40 rotatable by a rotation of the rotatable member and also movable in the axial direction of the elongated member 32 by the rotation of the rotatable member. The lifter 40 and the elongated member 32 are connected in such a manner that the lifter 40 and the elongated member 32 are integrally movable in the axial direction of the elongated member 32, and the elongated member 32 is connected to the lifter 40 under a condition in which the elongated member 32 is biased to the lifter 40 in a one-way direction of the axial direction by a biasing-connecting member (for example, an elastic resin member 72).

According to the above feature, since the flow-rate adjustable valve 1 adopts the structure using the back pressure chamber 4 and the pilot valve body 30, it is possible to operate the main valve body 10 with a smaller force.

In addition, according to the above feature, since the elongated member 32 is connected to the lifter 40 under a condition in which the elongated member 32 is biased to the lifter 40 in a one-way direction of the axial direction by a biasing-connecting member, generation of a backlash, which may be caused by the way how to connect the elongated member 32 and the lifter 40, can be inhibited more surely. This is more effective for inhibiting that hysteresis is generated in controlling the flow rate. In addition, when the pilot valve body 30 is positioned, generation of deviation is remarkably inhibited. Thus, even if the water-stop area is made as small as possible, the water can be stopped more surely. Thereby, both the reliable water stop and the rapid responsiveness can be achieved at the same time.

In view of moving constituents to one side, as described above, it is preferable that the lifter 40 is biased to the rotatable member (for example, the rotational shaft 61) in a one-way direction of the axial direction by a biasing member, such as the coil spring 73. In this case, generation of another backlash, which may be caused between the rotatable member (for example, the rotational shaft 61) and the lifter 40, can be surely inhibited. This also enhances the effect of inhibiting that hysteresis is generated in controlling the flow rate.

In this case, as described above, it is more preferable that the flow-rate adjustable valve 1 further includes the coupling member 50 configured to engage with the lifter 40 in a rotational direction of the lifter 40 and to transmit the rotation of the rotatable member to the lifter 40, wherein the biasing member (for example, the coil spring 73) biases the coupling member 50 and the lifter 40 in the axial direction and in a direction away from each other, and the coupling member 50, the biasing member and the lifter 40 are integrally rotated. According to this feature, since the coupling member 50, the biasing member and the lifter 40 are integrally rotated, no torsion moment is applied to the biasing member and the relative position between the rotatable member and the coupling member 50 is fixed, so that the rotational movement can be smoothly converted into an axial movement.

In addition, as described above, it is preferable that the rotatable member is the rotational shaft 61 of the motor, and the biasing member (for example, the coil spring 73) always biases the rotational shaft 61 in the same rotational direction via the coupling member 50. According to this feature, when a biasing force is generated in such a manner that the coupling member 50 and the lifter 40 are biased in the direction away from each other, a rotational force is also generated in the coupling member 50 due to such an engagement between the coupling member 50 and the lifter 40. The rotational force is transmitted to the rotational shaft 61 of the motor, so that inside member(s) of the motor is biased (moved) in a one-way direction of the rotational direction via the rotational shaft 61. This also enhances the effect of inhibiting that hysteresis is generated in controlling the flow rate. If the motor is the stepping motor 60, the flow-rate control can be achieved by a computer control (digital control). In addition, even if a small flow rate is controlled, water of the controlled small flow rate can be stably supplied by finely controlling the stepping motor 60. Of course, the motor is not limited to the stepping motor 60, and may be any type of motor.

In addition, as described above, it is more preferable that the biasing member (for example, the coil spring 73) biases the rotational shaft with a rotational torque not more than a detent torque of the motor. According to this feature, it is not necessary to always apply an electric current while the position of the pilot valve body 30 is to be kept.

In addition, as described above, it is preferable that the lifter 40 is provided with the protrusion 42, and the guiding slope 23 is provided, which is configured to abut on the protrusion 42 of the lifter 40 and to guide the protrusion 42 of the lifter 40 in the axial direction by the rotation of the lifter 40 so as to move the lifter 40 in the axial direction. In this case, it is possible to set a larger feed angle (an axially feed amount relative to a rotational angle), compared with a conventional screw type of lifter, which is rotated more than 360 degrees. Thereby, conversion of a rotational movement into an axial movement can be suitably achieved. That is to say, the valve body can be moved to a great extent by a slight rotation, which improves responsiveness.

In particular, it is more preferable that the lifter 40 is provided with the plurality of protrusions 42, which are distributed in the rotational direction of the lifter 40, and the plurality of guiding slopes 23 is provided, which are configured to abut on the respective protrusions 42 of the lifter 40 and to guide the respective protrusions 42 of the lifter 40 in the axial direction by the rotation of the lifter 40 so as to move the lifter 40 in the axial direction. When the plurality of protrusions 42 are respectively abutted on and guided by the plurality of guiding slopes 23, the conversion of the rotational movement into the axial movement can be achieved more smoothly. For example, as described above, the plurality of protrusions 42 are the three protrusions equally distributed in the rotational direction (distributed by 120 degrees).

In addition, as described above, it is preferable that the direction in which the elongated member 32 is biased to the lifter 40 by the biasing-connecting member (for example, the elastic resin member 72) is the same as the direction in which the lifter 40 is biased to the rotatable member (for example, the rotational shaft 61) by the biasing member (for example, the coil spring 73). According to this feature, it is possible to more reliably inhibit that hysteresis is generated in controlling the flow rate.

In addition, as described above, it is preferable that the direction in which the elongated member 32 is biased to the lifter 40 by the biasing-connecting member (for example, the elastic resin member 72) and the direction in which the lifter 40 is biased to the rotatable member (for example, the rotational shaft 61) by the biasing member (for example, the coil spring 73) are a direction for closing the pilot valve body 30. According to this feature, the pilot valve body 30 can be maintained stably in its closed state, when the rotatable member breaks down.

In addition, as described above, it is preferable that the pilot valve body 30 is adhesively attached to an end of the elongated member 32. According to this feature, it is possible to effectively inhibit that "slip (backlash)" is generated between the elongated member 32 and the pilot valve body 30.

In addition, as described above, it is preferable that the elongated member 32 has elasticity according to which the elongated member 32 is capable of extending and contracting in the axial direction. According to this feature, when the pilot valve body 30 is excessively pressed to the outlet hole 13, the elasticity of the elongated member 32 can absorb the excessive force.

In addition, as described above, it is preferable that an elastic force of the elongated member 32 is smaller than an elastic force of the biasing-connecting member (for example, the elastic resin member 72). According to this feature, the elongated member 32 is more likely to contract than the biasing-connecting member, which inhibits generation of breakage of the elongated member 32.

In addition, as described above, it is preferable that the biasing-connecting member is rotated integrally with the lifter 40. According to this feature, no great torsion torque is generated between the lifter 40 and the biasing-connecting member, and generation of sliding resistance therebetween is also inhibited. Thereby, the torque applied to the rotatable member can be reduced, and thus the rotatable member (the driving mechanism for the rotatable member) can be made compact.

Herein, in the flow-rate adjustable valve 1 according to the intermediate concept (2) as well, the rotatable member is not limited to the rotational shaft 61 of the stepping motor 60, but may be any rotatable member that may be manually rotated. That is to say, the flow-rate adjustable valve 1 may be a manual type of flow-rate adjustable valve.

Intermediate Concept (3) Obtained from the Present Embodiment (Inlet Hole 11)

The flow-rate adjustable valve 1 derivable from the present embodiment includes: the main valve body 10 movably supported in the flow path 2, 3 via the diaphragm membrane 11; the back pressure chamber 4 in which liquid supplied from the upstream side of the flow path 2 at a predetermined pressure is contained and a biasing force is generated in a valve-closing direction for closing the main valve body 10 by the supplied liquid; the plurality of inlet holes 12 communicating the upstream side of the flow path 2 with the back pressure chamber 4; the outlet hole 13 communicating a downstream side of the flow path 3 with the back pressure chamber 4; and the pilot valve body 30 for opening and closing the outlet hole 13, wherein the moments acting on the main valve body 10 based on the liquid flowing into the back pressure chamber 4 through the plurality of inlet holes 12 are canceled by each other in total (the sum of the moments is adjusted to 0.001 Nm or less), under a condition in which the pilot valve body 30 opens the outlet hole 13.

According to the above feature, since the flow-rate adjustable valve 1 adopts the structure using the back pressure chamber 4 and the pilot valve body 30, it is possible to operate the main valve body 10 with a smaller force.

In addition, since the plurality of inlet holes 12 are provided and since the moments acting on the main valve body 10 based on the liquid flowing into the back pressure chamber 4 through the plurality of inlet holes 12 are canceled by each other in total (the absolute value of the sum of the moments is adjusted to 0.001 Nm or less) under the condition in which the pilot valve body 30 opens the outlet hole 13, forces that may cause the inclination of the main valve body 10 during the movement of the main valve body 10 can be canceled by each other in total so that the posture of the main valve body 10 can be stably held.

As described above, the moments acting on the main valve body 10 based on the liquid flowing into the back pressure chamber 4 through the plurality of inlet holes 12 can be evaluated by analyzing measures using a computer, such as a CAE (Computer Aided Engineering) or a CFD (Computational Fluid Dynamics), which have been widely used in designing any flow-rate adjustable valve.

In addition, as described above, it is preferable that the plurality of inlet holes 12 are provided in the main valve body 10. In this case, it is possible to design the number of the inlet holes 12, the positions of the respective inlet holes 12, the size and shape of each inlet hole 12, and the like, at the same time when the main valve body 10 is designed.

In addition, as described above, it is preferable that each of the plurality of inlet holes 12 is provided as a straight channel in the main valve body 10. In this case, since the pressure loss caused by each inlet hole 12 is small, the inflow of the liquid and/or the discharge of the air can be carried out more efficiently.

In addition, as described above, it is preferable that the main valve body 10 has the substantially symmetric shape around the axis X of the main valve body 10 (see FIG. 2), and the center of gravity of the main valve body 10 is located on the axis X. In this case, since the balance of the main valve body 10 itself with respect to the force of gravity is good, it is easy to design the flow-rate adjustable valve 1 so as to inhibit the inclination of the main valve body 10 during the movement (valve-opening and valve-closing movements) of the main valve body 10.

In addition, as described above, it is preferable that the plurality of inlet holes 12 are arranged in one or more pairs, two inlet holes of each pair being located at positions symmetric with respect to the axis X of the main valve body 10. In this case, since the moments acting on the main valve body 10 based on the liquid flowing into the back pressure chamber 4 through the inlet holes 12 of each pair are canceled by each other, the inclination of the main valve body 10 during the movement of the main valve body 10 can be inhibited more effectively. Herein, it is more preferable that the inlet holes 12 of each pair have shapes (of cross sections) mirror symmetric with respect to the axis X of the main valve body 10. In general, the cross-section shape of each inlet hole is a circle (isotropic).

In addition, as described above, it is preferable that the main valve body 10 is arranged in such a manner that a direction in which the main valve body 10 is opened and closed is horizontal, at least one of the plurality of inlet holes 12 is arranged in an upper area with respect to the axis X of the main valve body 10, and at least another one of the plurality of inlet holes 12 is arranged in a lower area with respect to the axis X of the main valve body 10. In this case, the liquid can flow into the back pressure chamber 4 in a well-balanced manner from both the at least one inlet hole 12 arranged in the upper area and the at least one other inlet hole 12 arranged in the lower area, under a condition in which there is no liquid in the back pressure chamber 4 (for example, when a washing facility including the flow-rate adjustable valve is installed). Thus, the air in the back pressure chamber 4 is smoothly discharged and replaced with the liquid, which prevents an air-entrainment phenomenon (so-called air-biting). In addition, oppositely, when a liquid drainage is carried out, the liquid may be smoothly discharged and replaced with the air.

In addition, as described above, it is preferable that the main valve body 10 is fixed in the flow path 2, 3 via the diaphragm membrane 11 in such a manner that the main valve body 10 is not rotated around the axis X of the main valve body 10. In this case, it is easy to arrange the respective inlet holes 12 at the desired relative positions because it is enough to suitably determine the positions of the respective inlet holes 12 with respect to the main valve body 10.

In addition, as described above, it is preferable that the pilot valve body 30 is driven by the stepping motor 60. In this case, it is possible to control the operation of the pilot valve body 30 with high precision.

Herein, in the flow-rate adjustable valve 1 according to the intermediate concept (3) as well, the rotatable member is not limited to the rotational shaft 61 of the stepping motor 60, but may be any rotatable member that may be manually rotated. That is to say, the flow-rate adjustable valve 1 may be a manual type of flow-rate adjustable valve.

Intermediate Concept (4) Obtained from the Present Embodiment (Stopper 80)

The flow-rate adjustable valve 1 derivable from the present embodiment includes: a rotatable member (for example, the rotational shaft 61); the lifter 40 which is linearly movable by a rotation of the rotatable member; a valve body (for example, the pilot valve body 30) which is linearly movable by a linear movement of the lifter 40; the stopper 80 configured to restrict a movable range of the lifter 40 in the fixed state of the stopper 80 in which the position of the stopper 80 is not able to be changed; and a stopper-holding member (for example, the casing member 91 and the cover member 92) configured to hold the stopper 80 selectively in the fixed state or in the provisional fixed state in which the position of the stopper 80 is able to be changed.

According to this feature, the position of the stopper 80 can be changed while the stopper 80 is held in the provisional fixed state. Specifically, for example, after the stopper 80 has been held in the provisional fixed state in which the position of the stopper 80 is able to be changed, a water-stop area is adjusted by carrying out one or more water-passing and water-stop trials while the position of the stopper 80 is changed. Thereafter, it is possible to hold the stopper 80 by the stopper-holding member in the fixed state in which the position of the stopper 80 is not able to be changed. Thereby, a stroke of the valve body (for example, the pilot valve body 30) for each flow-rate adjustable valve 1 can be adjusted so as to achieve a suitable closed-valve position, regardless of variation among respective flow-rate adjustable valves.

As described above, the range, within which the position of the stopper 80 is able to be changed in the provisional fixed state, includes the water-stop area. In this case, after the stopper 80 has been held in the provisional fixed state in which the position of the stopper 80 is able to be changed, the water-stop area is adjusted by carrying out one or more water-passing and water-stop trials while the position of the stopper 80 is changed. Thereafter, it is possible to hold the stopper 80 by the stopper-holding member in the fixed state in which the position of the stopper 80 is not able to be changed. Thereby, a stroke of the valve body for each flow-rate adjustable valve 1 can be adjusted so as to achieve a suitable closed-valve position, regardless of variation among respective flow-rate adjustable valves.

In addition, it is preferable that the flow-rate adjustable valve 1 has a structure such as the window 92w of the cover member 92, which exposes at least a part of the stopper 80 outside when the stopper-holding member (for example, the casing member 91 and the cover member 92) holds the stopper 80 in the provisional fixed state. In this case, it is easy to change the position of the stopper 80 by engaging with the at least part of the stopper 80 exposed outside. Furthermore, it is preferable that the at least part of the stopper 80 is the knob 81 for the adjustment operation.

In addition, as described above, it is preferable that a scale associated with the provisional fixed state of the stopper 80 is viewable from outside when the stopper-holding member (for example, the casing member 91 and the cover member 92) holds the stopper 80 in the provisional fixed state. In this case, the operator can look at the scale and use it from outside while adjusting the water-stop area. Thereby, an adjustment operation for the water-stop area or the like by changing the position of the stopper 80 is easily carried out. Specifically, in the present embodiment, the adjustment operation for the water-stop area or the like is easily carried out while changing the position of the stopper 80, by using the relative positional relationship between the stripe patterns provided on the stopper 80 and/or the knob 81 and the indication 92i provided at the window 92w.

In addition, as described above, it is preferable that the lifter 40 is configured to rotate by the rotation of the rotational shaft 61 as a rotatable member, the lifter 40 is provided with the protrusion 42, the guiding slope 23 is provided, which is configured to abut on the protrusion 42 of the lifter 40 and to guide the protrusion 42 of the lifter 40 in a rotational axis direction by a rotation of the lifter 40 so as to move the lifter 40 in the rotational axis direction, and the stopper 80 is configured to restrict the movable range of the lifter 40 to a range less than 360 degrees. In this case, it is possible to set a larger feed angle (an axially feed amount relative to a rotational angle), compared with a conventional screw type of lifter, which is rotated more than 360 degrees. Thereby, conversion of a rotational movement into an axial movement can be suitably achieved. That is to say, the valve body can be moved to a great extent by a slight rotation, which improves responsiveness.

In addition, as described above, it is preferable that the rotatable member has the coupling member 50 configured to engage with the lifter 40 in a rotational direction thereof and to transmit the rotation thereof to the lifter 40, the coupling member 50 has the stopper-restricting part 58 that projects outward, and the stopper 80 has the pillar-like shape which has the substantially C-shaped section, encloses at least a part of the outer periphery of the coupling member 50, and restricts the movable range of the stopper-restricting part 58 of the coupling member 50 so as to restrict the movable range of the lifter 40. In this case, it is easy to restrict the movable range of the lifter 40 to a range of less than 360 degrees. In addition, the space occupied by the stopper 80 that encloses the at least part of the periphery of the coupling member 50 is small, which achieves space-saving and reduces the costs of the stopper 80.

Furthermore, as described above, it is preferable that the stopper 80 is switched to the fixed state when both ends in an axial direction of the stopper 80 are compressed and the substantially C-shaped section of the stopper 80 is enlarged. In this case, the resilient force of the compressed and enlarged stopper 80 acts to return the stopper 80 to its original shape, i.e., the resilient force acts to contract the substantially C-shaped section of the stopper 80 as well as extend the axial length of the stopper 80. As a result, the compressing force is increased, which makes the fixed state more stable. In addition, it is possible to flexibly design a structure for switching the stopper 80 between the provisional fixed state and the fixed state. Thus, it is possible to achieve such a structure at low costs.

Furthermore, as described above, it is preferable that the rotatable member is the rotational shaft 61 of the stepping motor 60, the stopper 80 is configured to be compressed by the casing member 91 arranged on the outer-periphery side of the lifter 40 and the cover member 92 fixed to the housing 62 of the stepping motor 60, and the fastening member for fastening the casing member 91 and the cover member 92 is further provided. In this case, the cover member 92 serves as both the structure for switching the stopper 80 between the provisional fixed state and the fixed state and the structure for fixing the stepping motor 60. Thus, the increase of the number of parts is inhibited.

Alternatively, as described above, it is preferable that the flow-rate adjustable valve 1 further includes the casing member 91 configured to contain the lifter 40, the cover member 92 configured to cover the casing member 91 from upward, and a fastening member (for example, special screw members 93) configured to fasten the casing member 91 and the cover member 92, wherein at least a part of the stopper 80 is compressed by the casing member 91 and the cover member 92 such that the stopper 80 is switched to the fixed state. In this case, the at least part of the stopper 80 is fixed by being compressed by the casing member 91 and the cover member 92 in an up-and-down direction. This reduces the possibility that the stopper 80 may move undesirably after the stopper 80 has been fixed. In addition, the number of parts can be made smaller.

In this case as well, as described above, it is preferable that the stopper 80 has the pillar-like shape which has the substantially C-shaped section, and the stopper 80 is switched to the fixed state when the both ends in the axial direction of the stopper 80 are compressed and the substantially C-shaped section of the stopper 80 is enlarged. According to this feature, the space occupied by the stopper 80 is small, which achieves space-saving and reduces the costs of the stopper 80. In addition, the resilient force of the compressed and enlarged stopper 80 acts to return the stopper 80 to its original shape. That is to say, the resilient force acts to contract the substantially C-shaped section of the stopper 80 as well as extend the axial length of the stopper 80. As a result, the compressing force is increased, which makes the fixed state more stable. In addition, it is possible to flexibly design a structure for switching the stopper 80 between the provisional fixed state and the fixed state. Thus, it is possible to achieve such a structure at low costs.

In this case as well, as described above, it is preferable that the rotatable member is a rotational shaft of a motor, the casing member 91 is arranged on the outer-periphery side of the lifter 40, the cover member 92 is fixed to a housing of the motor, and the stopper 80 is configured to be compressed by the casing member 91 and the cover member 92. According to this feature, the cover member 92 serves as both the structure for switching the stopper 80 between the provisional fixed state and the fixed state and the structure for fixing the motor. Thus, the increase of the number of parts is inhibited.

In addition, as described above, it is preferable that the rotatable member is the rotational shaft 61 of the stepping motor 60. In this case, the flow-rate control can be achieved by a computer control (digital control). In addition, even if a small flow rate is controlled, water of the controlled small flow rate can be stably supplied by finely controlling the stepping motor 60.

In addition, as described above, it is preferable that the fastening member includes one or more screw members 93, and the rotational axis of each screw member 93 is offset from the axis of the stopper 80. In this case, it is inhibited that the stopper 80 is undesirably rotated by an operational force for rotating each screw member 93. That is to say, when each screw member 93 is operated, it is prevented that the stopper 80 is undesirably rotated and the position of the stopper 80 is undesirably changed.

In addition, as described above, it is preferable that at least one of the both ends in the axial direction of the stopper 80 is provided with the inclination in which the length in the axial direction thereof is greater at the outer portion. In this case, the stopper 80 is stable in the compressed and enlarged state thereof. Thus, decentering of the stopper 80 is inhibited, which makes more stable the fixed state of the stopper 80 in which the position of the stopper 80 is not able to be changed.

In addition, as described above, it is preferable that a surface of a member configured to compress one end in the axial direction of the stopper 80 is provided with inclination in which a length in the axial direction thereof is smaller at an outer portion. In this case as well, the stopper 80 is stable in the compressed and enlarged state thereof. Thus, decentering of the stopper 80 is inhibited, which makes more stable the fixed state of the stopper 80 in which the position of the stopper 80 is not able to be changed.

The stopper 80 of the present embodiment is configured to restrict the rotatable range of the stopper-restricting part 58 of the coupling member 50 so as to restrict the rotatable range of the lifter 40. However, a stopper may be disposed to restrict the linearly movable range of the lifter 40. Specifically, for example, a protrusion may be provided on an outer-periphery side of the lifter 40, and a stopper may be disposed on an inner-periphery side of the casing member 91 so as to restrict the movable range of the protrusion.

In addition, the present invention provides a combination faucet for hot and cold water comprising two flow-rate adjustable valves 1, each of which includes any of the above features, wherein one of the two flow-rate adjustable valves 1 is connected to a cold water supply, and the other of the two flow-rate adjustable valves 1 connected to a hot water supply. According to this combination faucet, it is possible to mix hot water and cold water stably.

In addition, the present invention provides a method of manufacturing the flow-rate adjustable valve 1 including any of the above features, the method including: a provisionally fixing step of holding the stopper 80 by the stopper-holding member (for example, the casing member 91 and the cover member 92) in the provisional fixed state in which the position of the stopper 80 is able to be changed; an adjusting step of adjusting a water-stop area by carrying out one or more water-passing and water-stop trials while changing the position of the stopper 80, under the condition in which the stopper 80 is held in the provisional fixed state; and a fixing step of holding the stopper 80 by the stopper-holding member in the fixed state in which the position of the stopper 80 is not able to be changed, after the adjusting step.

According to this method, a stroke of a valve body (for example, the pilot valve body 30) for each flow-rate adjustable valve can be adjusted so as to achieve a suitable closed-valve position, regardless of variation among respective flow-rate adjustable valves.

In addition, the present invention provides a method of manufacturing the flow-rate adjustable valve 1 including the above coupling member 50, the method including: a provisionally fixing step of holding the stopper 80 by the stopper-holding member (for example, the casing member 91 and the cover member 92) in the provisional fixed state in which the position of the stopper 80 is able to be changed; an adjusting step of adjusting a water-stop area by carrying out one or more water-passing and water-stop trials while changing the position of the stopper 80 together with the coupling member 50, under the condition in which the stopper 80 is held in the provisional fixed state; and a fixing step of holding the stopper 80 by the stopper-holding member in the fixed state in which the position of the stopper 80 is not able to be changed, after the adjusting step.

According to this method as well, a stroke of a valve body (for example, the pilot valve body 30) for each flow-rate adjustable valve can be adjusted so as to achieve a suitable closed-valve position, regardless of variation among respective flow-rate adjustable valves. Furthermore, it is preferable to use the manual adjustment jig 85 for changing the position of the stopper 80 together with the coupling member 50.

Herein, in the flow-rate adjustable valve 1 according to the intermediate concept (4) as well, the rotatable member is not limited to the rotational shaft 61 of the stepping motor 60, but may be any rotatable member that may be manually rotated. That is to say, the flow-rate adjustable valve 1 may be a manual type of flow-rate adjustable valve.

Furthermore, the valve body of the flow-rate adjustable valve 1 according to the intermediate concept (4) may be the main valve body 10 of the flow-rate adjustable valve 1 (which may not include a pilot valve body). Alternatively, the valve body may be the pilot valve body 30, which moves the main valve body 10 by using the pressure in the back pressure chamber 4.

Intermediate Concept (5) Obtained from the Present Embodiment (Drive Unit 101)

The flow-rate adjustable valve 1 derivable from the present embodiment includes: a rotatable member (for example, the rotational shaft 61); the lifter 40 which is linearly movable by a rotation of the rotatable member; a valve body (for example, the pilot valve body 30) which is linearly movable by a linear movement of the lifter 40; and the base unit 102 having a valve seat (for example, the end 13e of the outlet hole 13 on the side of the back pressure chamber 4) with which the valve body contacts under the condition in which the valve body is closed. Furthermore, some members including the rotation shaft 61 as the rotatable member, the lifter 40 and the pilot valve body 30 are united to form the drive unit 101, and the drive unit 101 is integrally attachable to and removable from the base unit 102.

According to this feature, for a common maintenance operation, it is enough to remove the drive unit 101 from the base unit 102. That is to say, it is not necessary to break down the drive unit 101. Thus, the accumulation of the variation regarding the constituents (inside members) of the drive unit 101 is not changed even after the maintenance operation. Thus, it is possible to maintain the high performance in adjusting the flow rate without adjusting again the range restricted by the stopper 80.

As described above, when the drive unit 101 is removed from the base unit 102, the valve body is exposed. In this case, the maintenance operation for the valve body is very easy.

The valve body of the flow-rate adjustable valve 1 in the intermediate concept (5) may be the main valve body 10 of the flow-rate adjustable valve 1 (which may not include a pilot valve body). Alternatively, the valve body of the flow-rate adjustable valve 1 in the intermediate concept (5) may be the pilot valve body 30 which moves the main valve body 10 by using the pressure in the back pressure chamber 4.

In the embodiment described above, the valve body is the pilot valve body 30, the base unit 102 includes the main valve body 10 supported in the flow path 2, 3 via the diaphragm membrane 11, the back pressure chamber 4 is formed between the drive unit 101 and the main valve body 10, the inlet holes 12 are provided for communicating the upstream side of the flow path 2 and the back pressure chamber 4, and the outlet hole 13 is provided for communicating the downstream side of the flow path 3 and the back pressure chamber 4, wherein the pilot valve body 30 is capable of opening and closing the outlet hole 13. In this case, since the main valve body 10 is separated from the drive unit 101, the maintenance operation is easy.

In addition, in the embodiment described above, the drive unit 101 includes the back-pressure-chamber forming member 20 oppositely facing the main valve body 10, the elongated member 32 connecting the pilot valve body 30 to the lifter 40 passes through the back-pressure-chamber forming member 20 via the water-tight seal 34, and the lifter 40, the elongated member 32 and the pilot valve body 30 are linearly movable with respect to the back-pressure-chamber forming member 20. In this case, the rotatable member and the lifter 40 are separated from the liquid by the water-tight seal 34. Thus, the rotatable member and the lifter 40 are selectable from a wide range of parts.

In addition, as described above, it is preferable that the flow-rate adjustable valve 1 includes the fastening member for fastening the inside members of the drive unit 101 and the assembling member for assembling the drive unit 101 and the base unit 102, and that the fastening member and the assembling member are different types of members from each other. In this case, when the assembling member is operated to be removed, it is effectively prevented that the fastening member is operated to be removed in error.

In particular, it is more preferable that the fastening member is one or more special screw members 93, 96, and that the assembling member is one or more general screw members 103. In this case, without increasing any particular costs, it is possible to prevent that the fastening member is operated to be removed in error when the assembling member is operated to be removed. Herein, for example, the special screw member means a screw member having a strange-shaped head. For example, the special screw member has a star-shaped head.

In addition, as described above, it is preferable that the assembling member for assembling the drive unit 101 and the base unit 102 is the plurality of screw members 103 extending in the same direction. In this case, since the plurality of screw members 103 as the assembling member are aligned in the same direction, it is easy to operate the plurality of screw members 103. Specifically, the drive unit 101 can be easily attached to or removed from the base unit 102 without rotating the flow-rate adjustable valve 1 nor changing the posture thereof.

In addition, as described above, it is preferable that a water-tight member (for example, the sealing part 11s) is provided between a part of the drive unit 101 and a part of the base unit 102, and that another part of the drive unit 101 and another part of the base unit 102 are in direct contact with each other. In this case, the water-tight member functions to prevent leakage of the liquid at a desired area. In addition, due to the direct contact, even though the torque management of the assembling member 103 is not carried out, it is possible to always provide a predetermined "sealing margin". In addition, there is no concern about inclination of the drive unit 101 even when the plurality of assembling members 103 are assembled with different forces (different assembling degrees).

In addition, as described above, it is preferable that the drive unit 101 includes the stopper 80 configured to restrict a movable range of the lifter 40 in the fixed state of the stopper 80 in which the position of the stopper 80 is not able to be changed; and a stopper-holding member (for example, the casing member 91 and the cover member 92) configured to hold the stopper 80 selectively in the fixed state or in the provisional fixed state in which the position of the stopper 80 is able to be changed, and that at least a part of the stopper 80 is exposed outside the drive unit 101 when the stopper-holding member holds the stopper 80 in the provisional fixed state. In this case, it is easy to change the position of the stopper 80 by engaging with the at least part of the stopper 80 exposed outside, even after the drive unit 101 has been assembled.

Herein, in the flow-rate adjustable valve 1 according to the intermediate concept (5) as well, the rotatable member is not limited to the rotational shaft 61 of the stepping motor 60, but may be any rotatable member that may be manually rotated. That is to say, the flow-rate adjustable valve 1 may be a manual type of flow-rate adjustable valve.

EXPLANATION OF SIGN

1 flow-rate adjustment valve
2 flow path (upstream side)

2b bypassing flow path
3 flow path (downstream side)
3s valve seat
4 back pressure chamber
10 main valve body
11 diaphragm membrane (an example of elastic element)
12 inlet hole (two inlet holes)
13 outlet hole
13e one end of the outlet hole on the side of the back pressure chamber
15 contact part (hard material)
20 member forming the back pressure chamber
21 hollow part
22 upper cylindrical part
23 guiding slope (three guiding slopes)
24 engagement protrusion
30 pilot valve body
32 elongated member
32a shaft
32b distal-end member
32c elastic member
32g flow path for liquid movement (cut-out portion)
34 watertight seal
35 first spacer member
36 second spacer member
40 lifter
42 protrusion (three protrusions)
43 shaft-member-receiving hole
45 fitting concave part
47 elastic-resin-member-receiving part
50 coupling member
54 fitting hole
56 rotational-shaft-receiving part
58 stopper-restricting part
60 stepping motor
61 rotational shaft
62 housing
71 E-shaped ring (an example of retaining mechanism)
72 elastic resin member (an example of biasing-connecting member)
73 coil spring (an example of biasing member)
80 stopper
81 knob
82 inclination
85 manual adjustment jig
91 casing member
91t inclined surface
91b lower surface
92 cover member
92w window
92i indication
93 special screw member (fastening member)
96 special screw member (fastening member)
101 driving unit
102 base portion
102a receiving part of the base portion
102b upper surface of the base portion
103 normal screw (assembling member)
X axis of the main valve body

What is claimed is:

1. A flow-rate adjustable valve for adjusting a flow rate of liquid flowing through a flow path, the flow-rate adjustable valve comprising:
a rotatable member configured to be rotated by an electric motor;
a lifter linearly movable by a rotation of the rotatable member;
a pilot valve body supported by the lifter via an elastic member and linearly movable by a linear movement of the lifter;
a stopper configured to restrict a movable range of the lifter in a fixed state of the stopper in which a position of the stopper is not able to be changed; and
a stopper-holding member configured to hold the stopper selectively in the fixed state or in a provisional fixed state in which the position of the stopper is able to be changed,
wherein the movable range in each of the fixed state and the provisional state includes a closed-valve position,
wherein a limit of the movable range in each of the states on a closing side is configured to be a position obtained by adding a predetermined margin toward a closed-valve direction to the closed-valve position, and
wherein the limit of the movable range in the fixed state on the closing side is configured to determine a deformation amount of the elastic member when the pilot valve body is closed.

2. The flow-rate adjustable valve according to claim 1, wherein
at least a part of the stopper is exposed outside when the stopper-holding member holds the stopper in the provisional fixed state.

3. The flow-rate adjustable valve according to claim 1, wherein
a scale associated with the provisional fixed state of the stopper is viewable from outside when the stopper-holding member holds the stopper in the provisional fixed state.

4. The flow-rate adjustable valve according to claim 1, wherein
the lifter is configured to rotate by the rotation of the rotatable member,
the lifter is provided with a protrusion,
a guiding slope is provided, which is configured to abut on the protrusion of the lifter and to guide the protrusion of the lifter in a rotational axis direction by a rotation of the lifter so as to move the lifter in the rotational axis direction, and
the stopper is configured to restrict the movable range of the lifter to a range less than 360 degrees.

5. A combination faucet for hot and cold water comprising two flow-rate adjustable valves according to claim 1,
one of the two flow-rate adjustable valves is connected to a cold water supply, and
the other of the two flow-rate adjustable valves is connected to a hot water supply.

6. A method of manufacturing the flow-rate adjustable valve according to claim 1, the method comprising
a provisionally fixing step of holding the stopper by the stopper-holding member in the provisional fixed state in which the position of the stopper is able to be changed,
an adjusting step of adjusting the limit of the movable range by carrying out one or more water-passing and water-stop trials while changing the position of the stopper, under the condition in which the stopper is held in the provisional fixed state, and
a fixing step of holding the stopper by the stopper-holding member in the fixed state in which the position of the stopper is not able to be changed, after the adjusting step.

7. A flow-rate adjustable valve for adjusting a flow rate of liquid flowing through a flow path, the flow-rate adjustable valve comprising:

a rotatable member;
a lifter linearly movable by a rotation of the rotatable member;
a valve body linearly movable by a linear movement of the lifter;
a stopper configured to restrict a movable range of the lifter in a fixed state of the stopper in which a position of the stopper is not able to be changed; and
a stopper-holding member configured to hold the stopper selectively in the fixed state or in a provisional fixed state in which the position of the stopper is able to be changed,
wherein the movable range in each of the fixed state and the provisional state includes a closed-valve position,
wherein a limit of the movable range in each of the states on a closing side is configured to be a position obtained by adding a predetermined margin toward a closed-valve direction to the closed-valve position,
wherein the rotatable member has a coupling member configured to engage with the lifter in a rotational direction thereof and to transmit the rotation thereof to the lifter,
wherein the coupling member has a stopper-restricting part that projects outward, and
wherein the stopper has a pillar-like shape which has a substantially C-shaped section, encloses at least a part of an outer periphery of the coupling member, and restricts a movable range of the stopper-restricting part of the coupling member so as to restrict the movable range of the lifter.

8. The flow-rate adjustable valve according to claim 7, wherein
the stopper is switched to the fixed state when both ends in an axial direction of the stopper are compressed and the substantially C-shaped section of the stopper is enlarged.

9. The flow-rate adjustable valve according to claim 8, wherein
the rotatable member is a rotational shaft of a motor,
the stopper is configured to be compressed by a casing member arranged on an outer-periphery side of the lifter and a cover member fixed to a housing of the motor, and
a fastening member for fastening the casing member and the cover member is further provided.

10. The flow-rate adjustable valve according to claim 9, wherein
the rotatable member is a rotational shaft of a stepping motor.

11. The flow-rate adjustable valve according to claim 9, wherein
the fastening member includes one or more screw members, and
a rotational axis of each screw member is offset from an axis of the stopper.

12. The flow-rate adjustable valve according to claim 7, wherein
at least one of both ends in an axial direction of the stopper is provided with inclination in which a length in the axial direction thereof is greater at an outer portion.

13. The flow-rate adjustable valve according to claim 7, wherein
a surface of a member configured to compress one end in an axial direction of the stopper is provided with inclination in which a length in the axial direction thereof is smaller at an outer portion.

14. A method of manufacturing the flow-rate adjustable valve according to claim 7, the method comprising
a provisionally fixing step of holding the stopper by the stopper-holding member in the provisional fixed state in which the position of the stopper is able to be changed,
an adjusting step of adjusting the limit of the movable range by carrying out one or more water-passing and water-stop trials while changing the position of the stopper together with the coupling member, under the condition in which the stopper is held in the provisional fixed state, and
a fixing step of holding the stopper by the stopper-holding member in the fixed state in which the position of the stopper is not able to be changed, after the adjusting step.

15. A flow-rate adjustable valve for adjusting a flow rate of liquid flowing through a flow path, the flow-rate adjustable valve comprising:
a rotatable member;
a lifter linearly movable by a rotation of the rotatable member;
a valve body linearly movable by a linear movement of the lifter;
a stopper configured to restrict a movable range of the lifter in a fixed state of the stopper in which a position of the stopper is not able to be changed; and
a stopper-holding member configured to hold the stopper selectively in the fixed state or in a provisional fixed state in which the position of the stopper is able to be changed,
a casing member configured to contain the lifter,
a cover member configured to cover the casing member, and
a fastening member configured to fasten the casing member and the cover member,
wherein the movable range in each of the fixed state and the provisional state includes a closed-valve position,
wherein a limit of the movable range in each of the states on a closing side is configured to be a position obtained by adding a predetermined margin toward a closed-valve direction to the closed-valve position, and
wherein at least a part of the stopper is compressed by the casing member and the cover member such that the stopper is switched to the fixed state.

16. The flow-rate adjustable valve according to claim 15, wherein
the stopper has a pillar-like shape which has a substantially C-shaped section, and
the stopper is switched to the fixed state when both ends in an axial direction of the stopper are compressed and the substantially C-shaped section of the stopper is enlarged.

17. The flow-rate adjustable valve according to claim 16, wherein
the rotatable member is a rotational shaft of a motor,
the casing member is arranged on an outer-periphery side of the lifter,
the cover member is fixed to a housing of the motor, and
the stopper is configured to be compressed by the casing member and the cover member.

* * * * *